(12) United States Patent
Casey

(10) Patent No.: US 12,095,130 B2
(45) Date of Patent: Sep. 17, 2024

(54) METHODS AND SYSTEMS FOR SURFACE DISRUPTION OF BIPOLAR PLATE AND SUBSEQUENT USE THEREOF IN REDOX FLOW BATTERY

(71) Applicant: ESS TECH, INC., Wilsonville, OR (US)

(72) Inventor: Sean Casey, Portland, OR (US)

(73) Assignee: ESS TECH, INC., Wilsonville, OR (US)

(*) Notice: Subject to any disclaimer, the term of this patent is extended or adjusted under 35 U.S.C. 154(b) by 0 days.

(21) Appl. No.: 17/823,932

(22) Filed: Aug. 31, 2022

(65) Prior Publication Data
US 2023/0073599 A1 Mar. 9, 2023

Related U.S. Application Data

(60) Provisional application No. 63/260,795, filed on Aug. 31, 2021.

(51) Int. Cl.
*H01M 8/18* (2006.01)
*H01M 4/86* (2006.01)
*H01M 4/88* (2006.01)

(52) U.S. Cl.
CPC ......... *H01M 8/188* (2013.01); *H01M 4/8631* (2013.01); *H01M 4/8875* (2013.01); *H01M 2004/8694* (2013.01)

(58) Field of Classification Search
CPC ............. H01M 4/8631; H01M 4/8875; H01M 2004/029
See application file for complete search history.

(56) References Cited

U.S. PATENT DOCUMENTS

| 2004/0072074 A1* | 4/2004 | Partington | H01M 4/20 252/519.12 |
| 2008/0193850 A1* | 8/2008 | Ellis | H01M 4/68 429/234 |

(Continued)

FOREIGN PATENT DOCUMENTS

| EP | 4016681 A1 | 6/2022 |
| JP | 2004338269 A | * 12/2004 |

(Continued)

OTHER PUBLICATIONS

Lee, Dongyoung, Dai Gil Lee, and Jun Woo Lim. "Development of multifunctional carbon composite bipolar plate for vanadium redox flow batteries." Journal of Intelligent Material Systems and Structures 29.17 (2018): 3386-3395. (Year: 2018).*

(Continued)

*Primary Examiner* — Kenneth J Douyette
(74) *Attorney, Agent, or Firm* — McCoy Russell LLP

(57) ABSTRACT

Systems and methods are provided for mechanical pretreatment of bipolar plates, for example, for plating electrodes in redox flow batteries. In one example, a method for disrupting surfaces of a bipolar plate may include pressing the bipolar plate between imprint plates, and removing the pressed bipolar plate from the imprint plates prior to use in a redox flow battery. In some examples, the pressed bipolar plate may include negative indentations from at least one of the imprint plates. In some examples, the imprint plates may be patterned meshes, such that the negative indentations may include patterns of asymmetric protrusions. In this way, the bipolar plate may be pretreated via pressing so as to reduce wear to manufacturing equipment (relative to other mechanical pretreatment processes, for example) while maintaining electrochemical performance of the redox flow battery.

14 Claims, 15 Drawing Sheets

(56) References Cited

U.S. PATENT DOCUMENTS

| | | | |
|---|---|---|---|
| 2018/0331373 A1* | 11/2018 | Byun | ............... H01M 8/0258 |
| 2019/0379062 A1* | 12/2019 | Fujita | ................. H01M 8/188 |
| 2020/0052318 A1 | 2/2020 | Evans | |
| 2022/0134292 A1 | 5/2022 | Liu et al. | |
| 2022/0200030 A1 | 6/2022 | Liu et al. | |
| 2022/0200035 A1 | 6/2022 | Kender | |
| 2022/0209274 A1 | 6/2022 | Nicholls et al. | |

FOREIGN PATENT DOCUMENTS

| | | |
|---|---|---|
| JP | 2014207122 A | 10/2014 |
| KR | 101359704 B1 | 2/2014 |
| WO | 2006113084 A2 | 10/2006 |

OTHER PUBLICATIONS

ISA Korean Intellectual Property Office, International Search Report and Written Opinion Issued in Application No. PCT/US2022/075793, Dec. 21, 2022, WIPO, 11 pages.

* cited by examiner

METHODS AND SYSTEMS FOR SURFACE DISRUPTION OF BIPOLAR PLATE AND SUBSEQUENT USE THEREOF IN REDOX FLOW BATTERY

CROSS REFERENCE TO RELATED APPLICATIONS

The present application claims priority to U.S. Provisional Application No. 63/260,795 entitled "METHODS AND SYSTEMS FOR SURFACE DISRUPTION OF BIPOLAR PLATE AND SUBSEQUENT USE THEREOF IN REDOX FLOW BATTERY" and filed on Aug. 31, 2021. The entire contents of the above-identified application are hereby incorporated by reference for all purposes.

FIELD

The present description relates generally to systems and methods for disrupting surfaces of bipolar plates, particularly for use with plating electrodes in redox flow batteries.

BACKGROUND AND SUMMARY

Redox flow batteries are suitable for grid-scale storage applications due to their capability for scaling power and capacity independently, as well as for charging and discharging over thousands of cycles with reduced performance losses in comparison to conventional battery technologies. An all-iron hybrid redox flow battery is particularly attractive due to incorporation of low-cost, earth-abundant materials. In general, iron redox flow batteries (IFBs) rely on iron, salt, and water for electrolyte, thus including simple, earth-abundant, and inexpensive materials, and eliminating incorporation of harsh chemicals and reducing an environmental footprint thereof.

The IFB may include a positive (redox) electrode where a redox reaction occurs and a negative (plating) electrode where ferrous iron ($Fe^{2+}$) in the electrolyte may be reduced and plated. Various side reactions may compete with the $Fe^{2+}$ reduction, including proton reduction, iron corrosion, and iron plating oxidation:

$$H^+ + e^- \leftrightarrow \tfrac{1}{2}H_2 \text{ (proton reduction)} \quad (1)$$

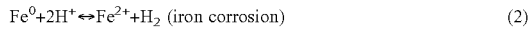
$$Fe^0 + 2H^+ \leftrightarrow Fe^{2+} + H_2 \text{ (iron corrosion)} \quad (2)$$

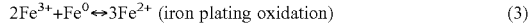
$$2Fe^{3+} + Fe^0 \leftrightarrow 3Fe^{2+} \text{ (iron plating oxidation)} \quad (3)$$

As most side reactions occur at the plating electrode, IFB cycling capabilities may be limited by available iron plating on the plating electrode.

In some examples, the redox and plating electrodes may be in physical or fluid contact with respective bipolar plates. The bipolar plates may desirably be highly conductive, such that the electrolyte may be transported to reaction sites of the redox and plating electrodes, and may further serve as fluid separators for electrolyte flow and distribution. In one example, a bipolar plate installed for use with the plating electrode may be formed from a graphite composite. Preparation of the graphite composite based bipolar plate may include compression or injection molding of a graphite composite starting material. In some examples, such molding processes may generate a resin-rich outer layer on one or more surfaces of the bipolar plates. However, bipolar plates formed in this way may be ill-suited for IFB inclusion, as the resin-rich outer layer may induce relatively high resistance and relatively poor conductivity and result in relatively poor plating quality.

Accordingly, pretreatment of molded graphite composite based bipolar plates may be employed to mitigate poor electrochemical performance therefrom during IFB operation. For example, the bipolar plates may be mechanically pretreated via grinding, polishing, sand blasting, sand paper polishing, a timing belt, and/or other manual or automated mechanical pretreatments that scrape or scratch the bipolar plates. However, such mechanical pretreatments may generate inconsistent roughening of surfaces of the bipolar plates, brought on by uneven pressures and application times of manufacturing equipment used. Further, machining may result in unwanted fragments of the resin rich layer being retained at the bipolar plates (which may interfere with the manufacturing equipment, for example, resulting in excessive degradation to manufacturing components and concomitant increases in replacement and maintenance costs). Difficulties may arise even in retaining uniform precision and roughening among various manufacturing components or setups, as differing tolerances may result in increased random error distribution of surface structures on individual bipolar plates or between separately manufactured bipolar plates.

In one example, the issues described above may be addressed by a method for disrupting surfaces of a bipolar plate for use in a redox flow battery, the method including pressing the bipolar plate between upper and lower imprint plates, and thereafter removing the bipolar plate from the upper and lower imprint plates prior to use in the redox flow battery. In some examples, following the pressing, upper and lower surfaces of the bipolar plate may be textured with respective negative indentations of patterns of the upper and lower imprint plates. In one example, the negative indentations may include patterns of asymmetric protrusions. In this way, following the pressing, at least one surface of the bipolar plate may be disrupted and uniformly roughened with less excess particulates, flakes and other debris retained thereon relative to other abrasive mechanical pretreatments, such that long-term durability of both the redox flow battery and manufacturing equipment for pretreatment (e.g., surface disruption) of the bipolar plate may be maintained or improved without sacrificing electrochemical performance of the redox flow battery.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for pretreating a bipolar plate by disrupting surfaces thereof (for example, via pressing), whereafter the bipolar plate may be used with a negative electrode, for example, in a redox flow battery. The redox flow battery is depicted schematically in FIG. 1 with an integrated multi-chamber tank having separate positive and negative electrolyte chambers. In some examples, the redox flow battery may be an all-iron flow battery (IFB) utilizing iron redox chemistry at both a positive (redox) electrode and the negative (plating) electrode of the IFB. The electrolyte chambers may be coupled to one or more battery cells, each cell including the positive and negative electrodes. Therefrom, electrolyte may be pumped through positive and negative electrode compartments respectively housing the positive and negative electrodes. The positive and negative electrode compartments may further house respective bipolar plates positioned to facilitate electrolyte flow through the respective electrode compartments and to reaction sites at the respective electrodes.

Additionally or alternatively, the redox flow battery may be a hybrid redox flow battery. Hybrid redox flow batteries are redox flow batteries which may be characterized by deposition of one or more electroactive materials as a solid layer on an electrode (e.g., the negative electrode). Hybrid redox flow batteries may, for instance, include a chemical species which may plate via an electrochemical reaction as a solid on a substrate throughout a battery charge process. During battery discharge, the plated species may ionize via a further electrochemical reaction, becoming soluble in the electrolyte. In hybrid redox flow battery systems, a charge capacity (e.g., a maximum amount of energy stored) of the redox flow battery may be limited by an amount of chemical species (e.g., a metal) plated during battery charge and may accordingly depend on an efficiency of the plating system (e.g., including the bipolar plates) as well as volume and surface area available for plating.

Figure 2A:
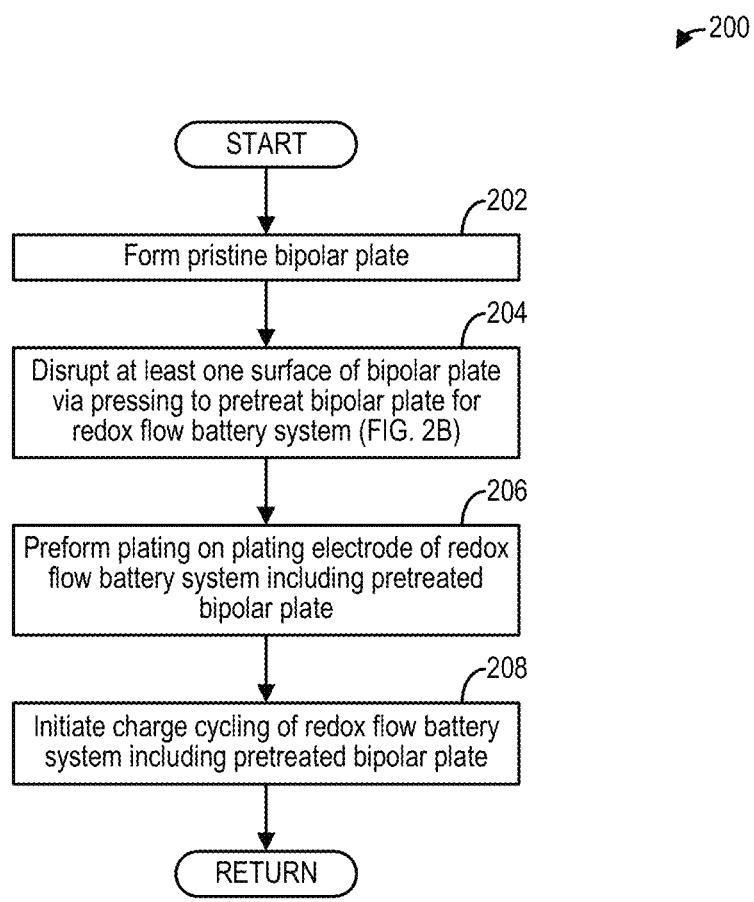
FIG. 2A shows a flow chart of a method for preparing and operating a redox flow battery system including a surface disrupted bipolar plate.
Figure 2B:
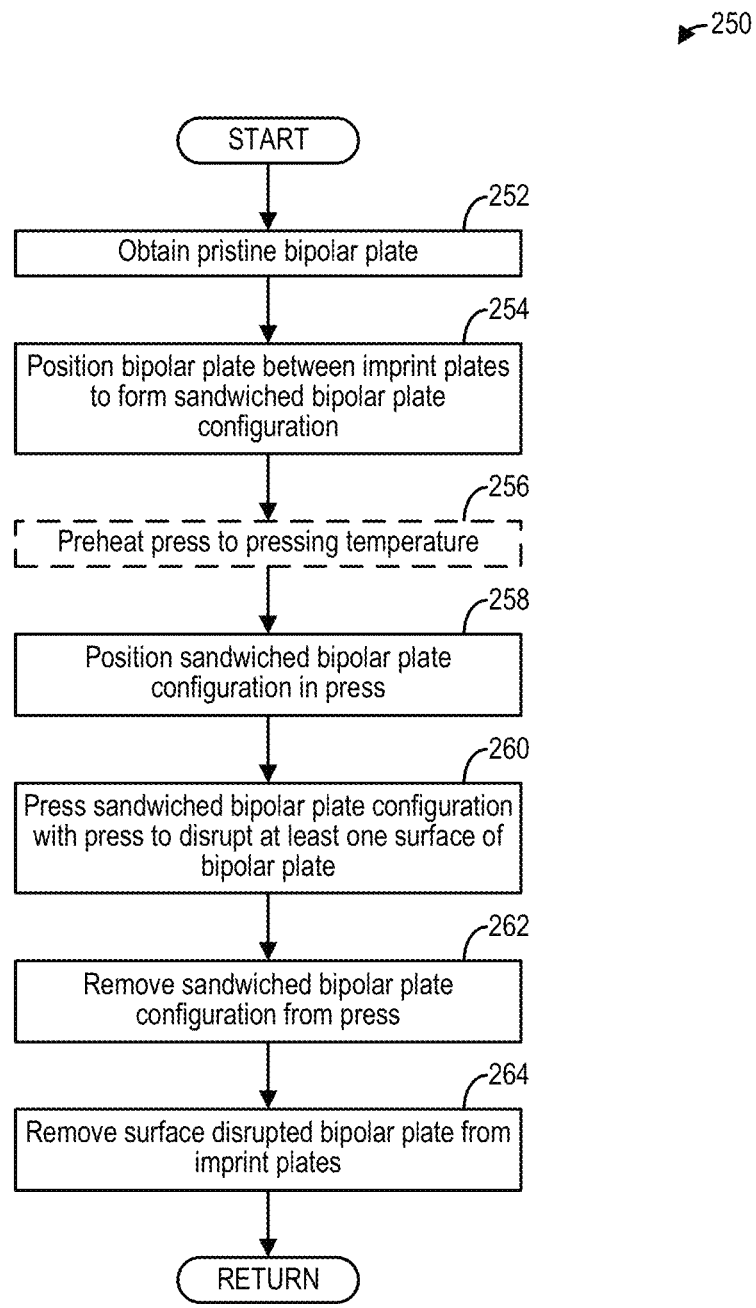
FIG. 2B shows a flow chart of a method for pretreating a bipolar plate for use with the redox flow battery system of FIG. 2A, including disrupting at least one surface of the bipolar plate via pressing.
Figure 3B:
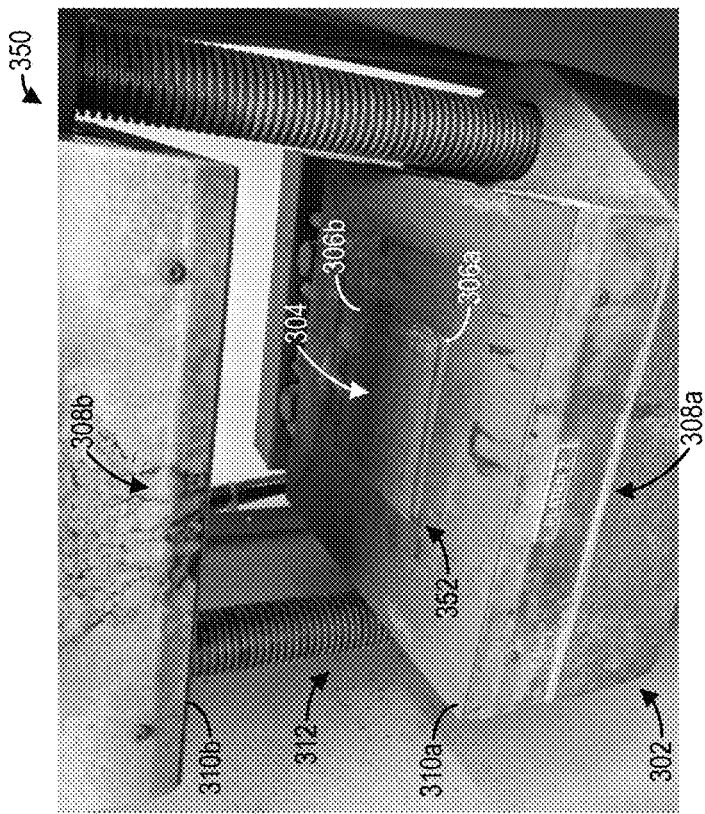
FIGS. 3A-3B show perspective views of a bipolar plate and imprint plates positioned in a heat press.
Figure 3A:
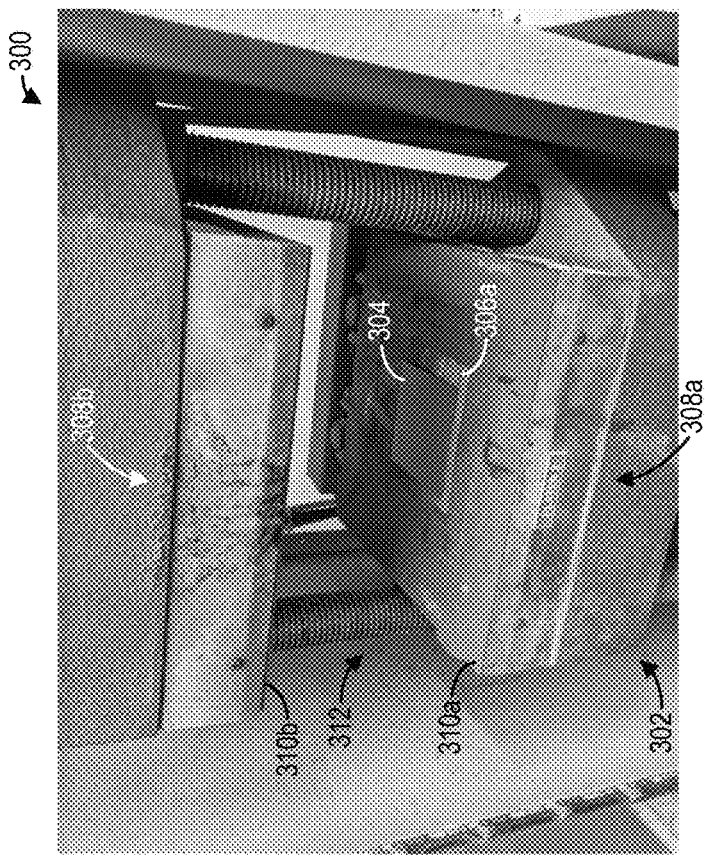

In some examples, the bipolar plates may include a resin rich layer following manufacturing, which may result in relatively high resistance and relatively poor plating and conductivity at the negative electrode. For example, the bipolar plate included in the negative electrode compartment may be formed by injection molding or compression molding a graphite composite material, resulting in the resin rich layer. Such bipolar plates may desirably be pretreated so as to disrupt, reduce, and/or otherwise deform the resin rich layer and thereby mitigate electrochemical performance losses ascribed thereto. Accordingly, in embodiments provided herein, a redox flow battery system may include a bipolar plate that has been mechanically pretreated via pressing the bipolar plate sandwiched between two imprint plates such that at least one resin rich layer of the bipolar plate is textured or otherwise roughened. Example methods for pretreating the bipolar plate via such pressing and for preparing and operating the redox flow battery system including the pretreated bipolar plate are depicted at FIGS. 2A and 2B. An exemplary heat press for pressing having the bipolar plate and the two imprint plates positioned therein is depicted in FIG. 3A and FIG. 3B.

Figure 4:
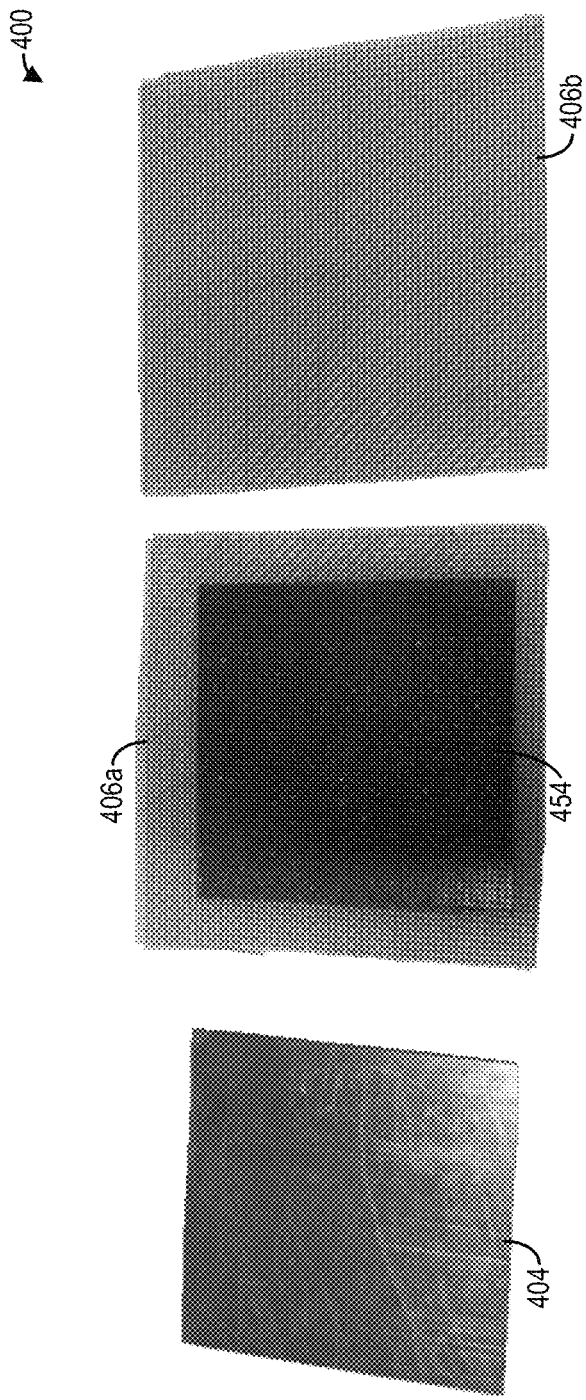
FIG. 4 shows top perspective views of imprint plates and exemplary bipolar plates prior to and following pressing with the imprint plates.
Figure 5B:
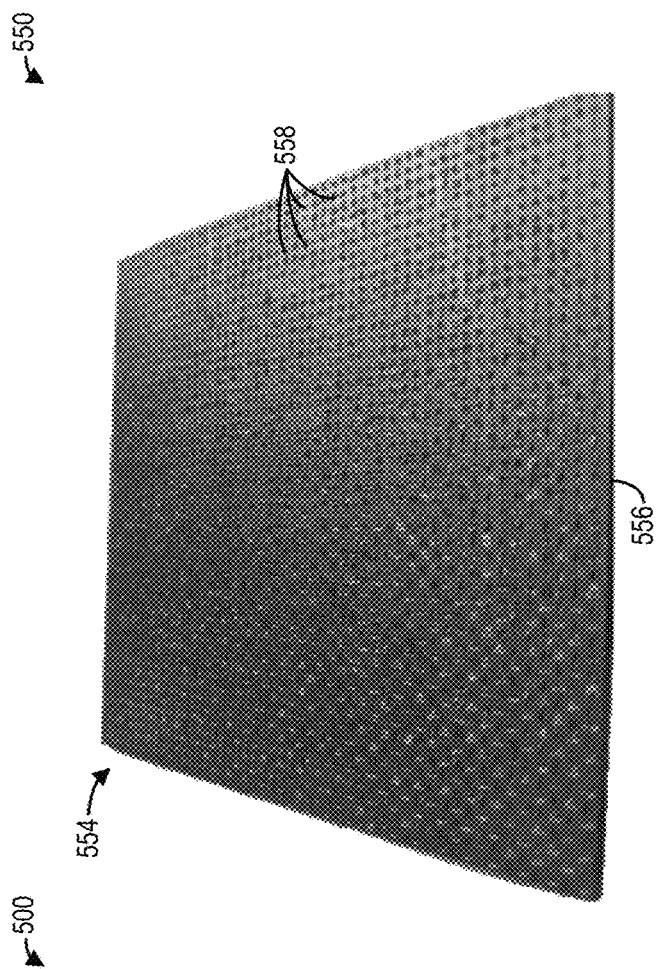
FIGS. 5A-5B show top perspective views of exemplary bipolar plates prior to and following pressing with imprint plates.
Figure 5A:
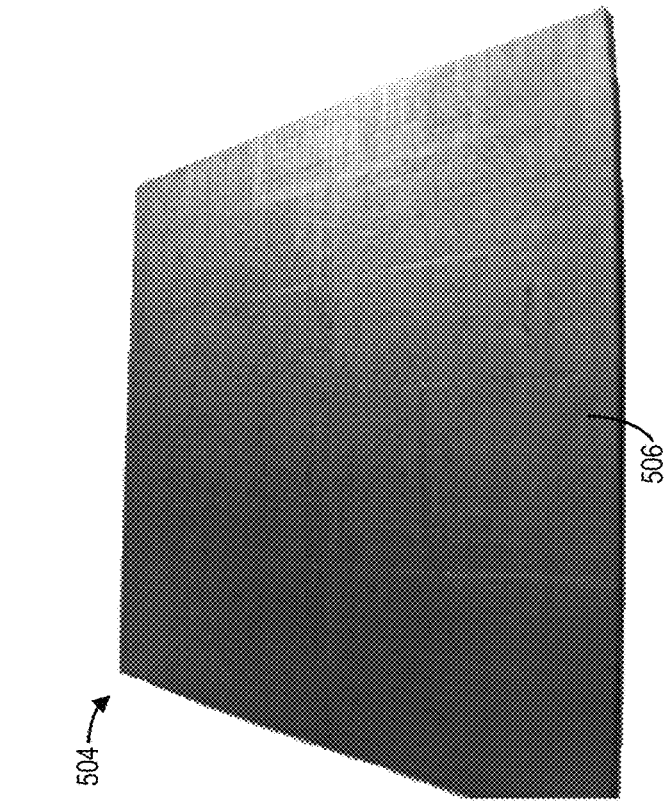
Figure 7:
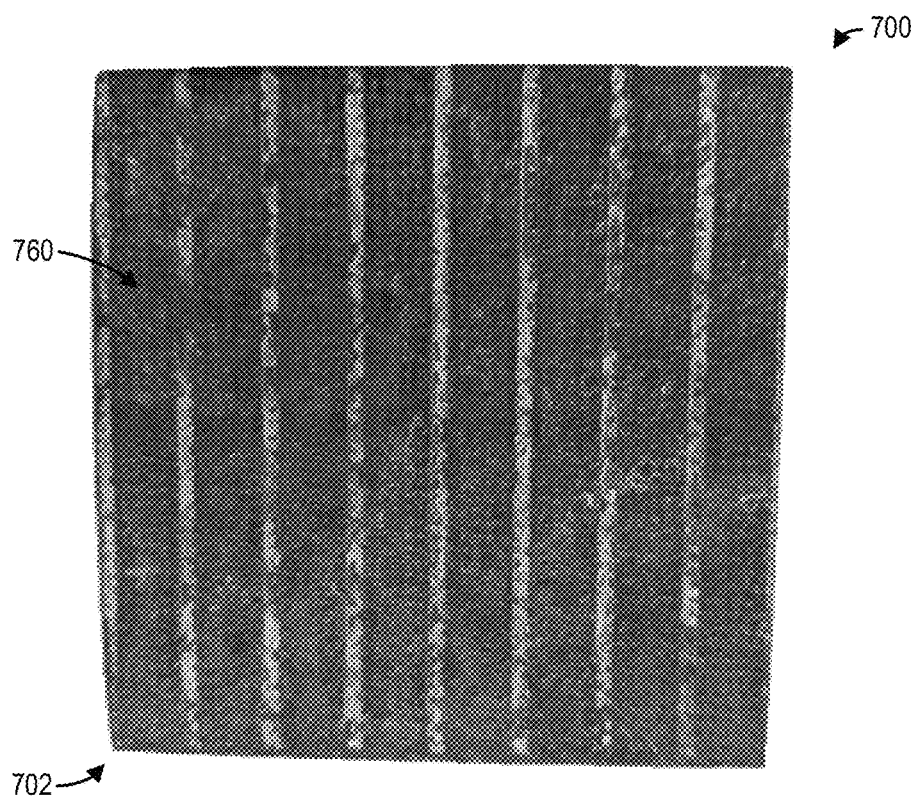
FIG. 7 shows a top view of a first exemplary bipolar plate following initial charge cycling of a redox flow battery system including the first exemplary bipolar plate.
Figure 8:
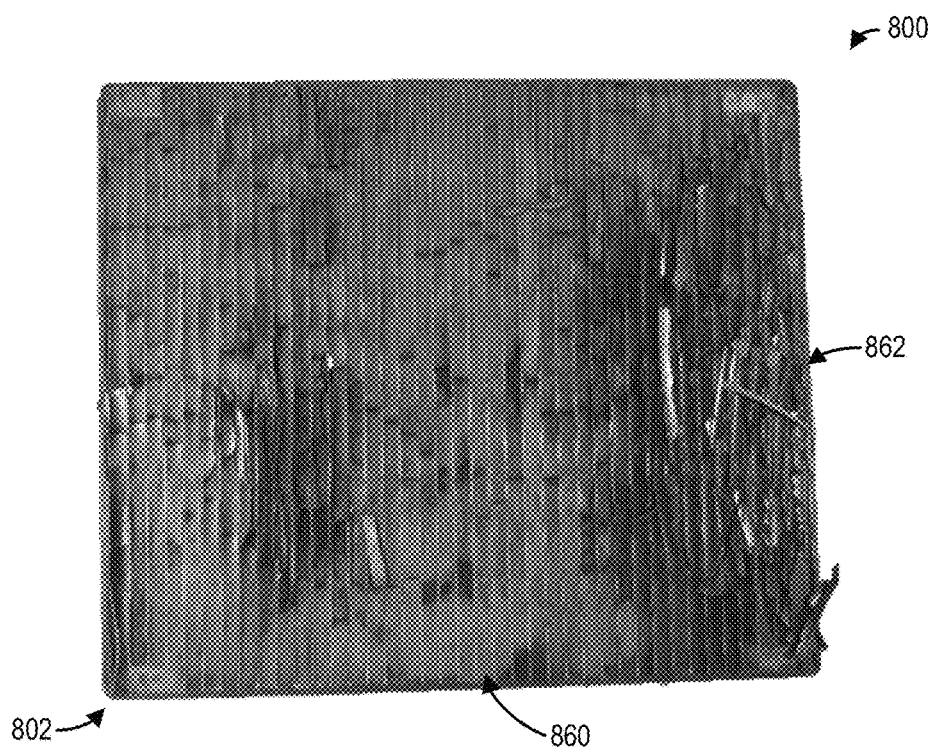
FIG. 8 shows a top view of a second exemplary bipolar plate following initial charge cycling of a redox flow battery system including the second exemplary bipolar plate.

For comparison, top perspective views of pristine (e.g., untreated) and pressed bipolar plates, as well as imprint plates therefor, are depicted at FIG. 4. Additional views of pristine and pressed bipolar plates are depicted at FIGS. 5A-5B, 10, and 11, where greater detail is visible. As shown at FIGS. 4 and 5A-5B, the pressing may disrupt and indent at least one surface of the bipolar plate with a repeating pattern of asymmetric protrusions so as to obtain sufficient roughness and coverage without excessive flaking. Such roughness may be characterized by roughness average (Ra), mean height (Rc), core roughness (Rk), and mean width of the roughness profile elements (Rsm) values, which are variously plotted for pristine and mechanically pretreated bipolar plates in FIGS. 6 and 12A-12D. Following surface disruption, a given bipolar plate, such as the surface disrupted bipolar plate depicted at FIG. 9B, may be positioned in an electrode assembly of an electrode assembly stack, such as the electrode assembly stack depicted at FIG. 9A, and included in a redox flow battery system. FIGS. 7 and 8 further depict bipolar plates following initial charge cycling of redox flow battery systems respectively including the bipolar plates.

Figure 1:
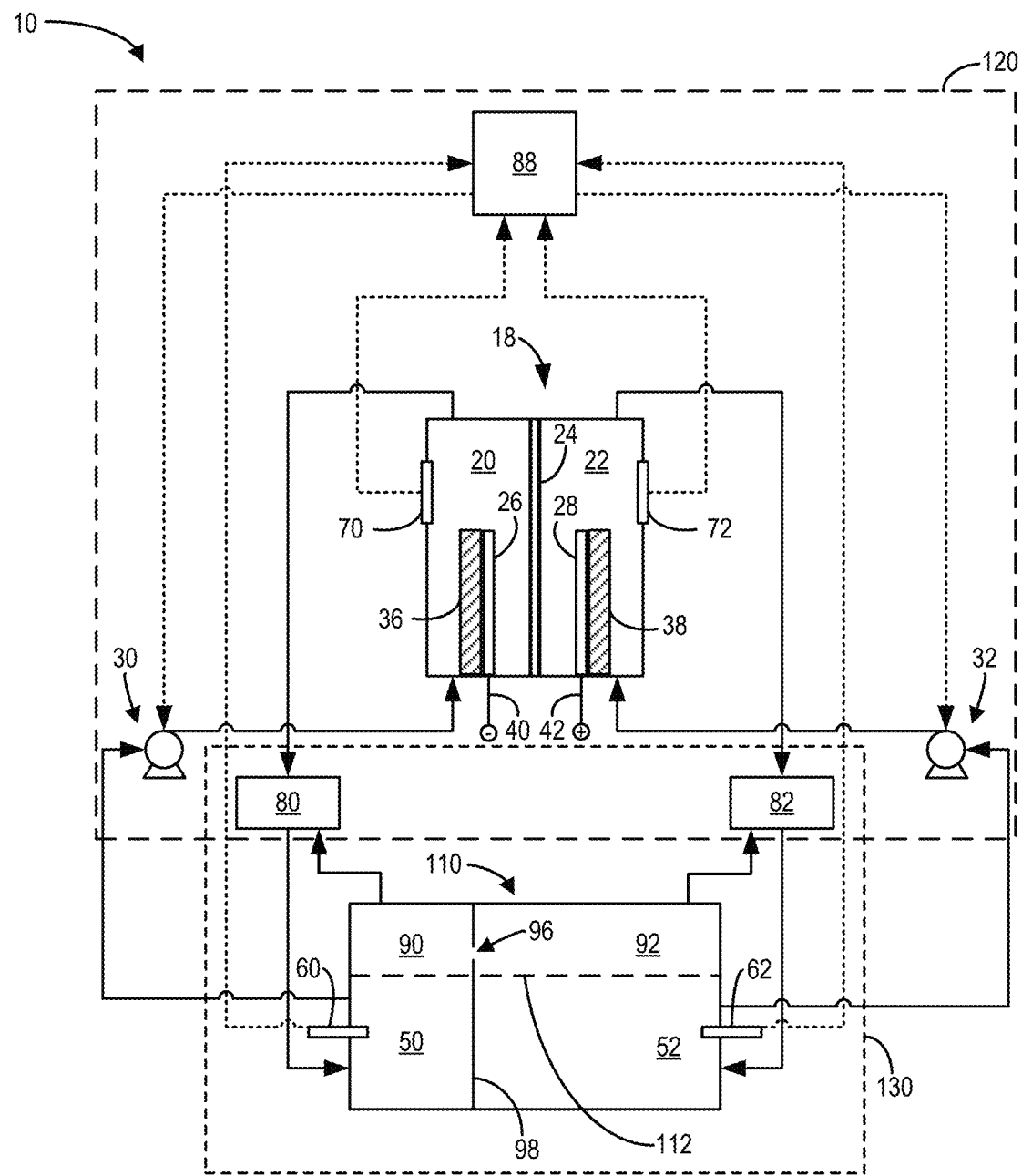
FIG. 1 shows a schematic diagram of an example redox flow battery system including a battery cell with redox and plating electrodes, surface disrupted bipolar plates, and a membrane separator.

As shown in FIG. 1, in a redox flow battery system 10, a negative electrode 26 may be referred to as a plating electrode and a positive electrode 28 may be referred to as a redox electrode. A negative electrolyte within a plating side (e.g., a negative electrode compartment 20) of a redox flow battery cell 18 may be referred to as a plating electrolyte, and a positive electrolyte on a redox side (e.g., a positive electrode compartment 22) of the redox flow battery cell 18 may be referred to as a redox electrolyte.

"Anode" refers to an electrode where electroactive material loses electrons and "cathode" refers to an electrode where electroactive material gains electrons. During battery charge, the negative electrolyte gains electrons at the negative electrode 26, and the negative electrode 26 is the cathode of the electrochemical reaction. During battery discharge, the negative electrolyte loses electrons, and the negative electrode 26 is the anode of the electrochemical reaction. Alternatively, during battery discharge, the negative electrolyte and the negative electrode 26 may be respectively referred to as an anolyte and the anode of the electrochemical reaction, while the positive electrolyte and the positive electrode 28 may be respectively referred to as a catholyte and the cathode of the electrochemical reaction. During battery charge, the negative electrolyte and the negative electrode 26 may be respectively referred to as the catholyte and the cathode of the electrochemical reaction, while the positive electrolyte and the positive electrode 28 may be respectively referred to as the anolyte and the anode of the electrochemical reaction. For simplicity, the terms "positive" and "negative" are used herein to refer to the electrodes, electrolytes, and electrode compartments in redox flow battery systems.

One example of a hybrid redox flow battery is an all-iron redox flow battery (IFB), in which the electrolyte includes iron ions in the form of iron salts (e.g., $FeCl_2$, $FeCl_3$, and the like), wherein the negative electrode 26 includes metal iron. For example, at the negative electrode 26, ferrous iron ($Fe^{2+}$) gains two electrons and plates as iron metal ($Fe^0$) onto the negative electrode 26 during battery charge, and $Fe^0$ loses two electrons and re-dissolves as $Fe^{2+}$ during battery discharge. At the positive electrode 28, $Fe^{2+}$ loses an electron to form ferric iron ($Fe^{3+}$) during battery charge, and $Fe^{3+}$ gains an electron to form $Fe^{2+}$ during battery discharge. The electrochemical reaction is summarized in equations (4) and (5), wherein the forward reactions (left to right) indicate electrochemical reactions during battery charge, while the reverse reactions (right to left) indicate electrochemical reactions during battery discharge:

$$Fe^{2+}+2e^- \leftrightarrow Fe^0 \;\; -0.44 \text{ V (negative electrode)} \quad (4)$$

$$Fe^{2+} \leftrightarrow 2Fe^{3+}+2e^- \;\; +0.77 \text{ V (positive electrode)} \quad (5)$$

As discussed above, the negative electrolyte used in the IFB may provide a sufficient amount of $Fe^{2+}$ so that, during battery charge, $Fe^{2+}$ may accept two electrons from the negative electrode 26 to form $Fe^0$ and plate onto a substrate. During battery discharge, the plated $Fe^0$ may lose two electrons, ionizing into $Fe^{2+}$ and dissolving back into the electrolyte. An equilibrium potential of the above reaction is −0.44 V and this reaction therefore provides a negative terminal for the desired system. On the positive side of the IFB, the electrolyte may provide $Fe^{2+}$ during battery charge which loses an electron and oxidizes to $Fe^{3+}$. During battery discharge, $Fe^{3+}$ provided by the electrolyte becomes $Fe^{2+}$ by absorbing an electron provided by the positive electrode 28. An equilibrium potential of this reaction is +0.77 V, creating a positive terminal for the desired system.

The IFB may provide the ability to charge and recharge electrolytes therein in contrast to other battery types utilizing non-regenerating electrolytes. Charge may be achieved by respectively applying an electric current across the electrodes 26 and 28 via terminals 40 and 42. The negative electrode 26 may be electrically coupled via the terminal 40 to a negative side of a voltage source so that electrons may be delivered to the negative electrolyte via the positive electrode 28 (e.g., as $Fe^{2+}$ is oxidized to $Fe^{3+}$ in the positive electrolyte in the positive electrode compartment 22). The electrons provided to the negative electrode 26 may reduce the $Fe^{2+}$ in the negative electrolyte to form $Fe^0$ at the (plating) substrate, causing the $Fe^{2+}$ to plate onto the negative electrode 26.

Discharge may be sustained while $Fe^0$ remains available to the negative electrolyte for oxidation and while $Fe^{3+}$ remains available in the positive electrolyte for reduction. As an example, $Fe^{3+}$ availability may be maintained by increasing a concentration or a volume of the positive electrolyte in the positive electrode compartment 22 side of the redox flow battery cell 18 to provide additional $Fe^{3+}$ ions via an external source, such as an external positive electrolyte chamber 52. More commonly, availability of $Fe^0$ during discharge may be an issue in IFB systems, wherein the $Fe^0$ available for discharge may be proportional to a surface area and a volume of the negative electrode substrate, as well as to a plating efficiency. Charge capacity may be dependent on the availability of $Fe^{2+}$ in the negative electrode compartment 20. As an example, $Fe^{2+}$ availability may be maintained by providing additional $Fe^{2+}$ ions via an external source, such as an external negative electrolyte chamber 50 to increase a concentration or a volume of the negative electrolyte to the negative electrode compartment 20 side of the redox flow battery cell 18.

In an IFB, the positive electrolyte may include ferrous iron, ferric iron, ferric complexes, or any combination thereof, while the negative electrolyte may include ferrous iron or ferrous complexes, depending on a state of charge (SOC) of the IFB system. As previously mentioned, utilization of iron ions in both the negative electrolyte and the positive electrolyte may allow for utilization of the same electrolytic species on both sides of the redox flow battery cell 18, which may reduce electrolyte cross-contamination and may increase the efficiency of the IFB system, resulting in less electrolyte replacement as compared to other redox flow battery systems.

Efficiency losses in an IFB may result from electrolyte crossover through a separator 24 (e.g., ion-exchange membrane barrier, microporous membrane, and the like). For example, $Fe^{3+}$ ions in the positive electrolyte may be driven toward the negative electrolyte by a $Fe^{3+}$ ion concentration gradient and an electrophoretic force across the separator 24. Subsequently, $Fe^{3+}$ ions penetrating the separator 24 and crossing over to the negative electrode compartment 20 may result in coulombic efficiency losses. $Fe^{3+}$ ions crossing over from the low pH redox side (e.g., more acidic positive electrode compartment 22) to the high pH plating side (e.g., less acidic negative electrode compartment 20) may result in precipitation of $Fe(OH)_3$. Precipitation of $Fe(OH)_3$ may degrade the separator 24 and cause permanent battery performance and efficiency losses. For example, $Fe(OH)_3$ precipitate may chemically foul an organic functional group of an ion-exchange membrane or physically clog micropores of the ion-exchange membrane. In either case, due to the $Fe(OH)_3$ precipitate, membrane ohmic resistance may rise over time and battery performance may degrade. Precipitate may be removed by washing the IFB with acid, but constant maintenance and downtime may be disadvantageous for commercial battery applications. Furthermore, washing may be dependent on regular preparation of electrolyte, contributing to additional processing costs and complexity. Alternatively, adding specific organic acids to the positive electrolyte and the negative electrolyte in response to electrolyte pH changes may mitigate precipitate formation during battery charge and discharge cycling without driving up overall costs. Additionally, implementing a membrane barrier that inhibits $Fe^{3+}$ ion crossover may also mitigate fouling.

Additional coulombic efficiency losses may be caused by reduction of $H^+$ (e.g., protons) and subsequent formation of $H_2$ gas, and a reaction of protons in the negative electrode compartment 20 with electrons supplied at the plated iron metal of the negative electrode 26 to form $H_2$ gas.

The IFB electrolyte (e.g., $FeCl_2$, $FeCl_3$, $FeSO_4$, $Fe_2(SO_4)_3$, and the like) may be readily available and may be produced at low costs. In one example, the IFB electrolyte may be formed from ferrous chloride ($FeCl_2$), potassium chloride (KCl), manganese(II) chloride ($MnCl_2$), and boric acid ($H_3BO_3$). The IFB electrolyte may offer higher reclamation value because the same electrolyte may be used for the negative electrolyte and the positive electrolyte, consequently reducing cross-contamination issues as compared to other systems. Furthermore, because of iron's electron configuration, iron may solidify into a generally uniform solid structure during plating thereof on the negative electrode substrate. For zinc and other metals commonly used in hybrid redox batteries, solid dendritic structures may form during plating. A stable electrode morphology of the IFB system may increase the efficiency of the battery in comparison to other redox flow batteries. Further still, iron redox flow batteries may reduce the use of toxic raw materials and may operate at a relatively neutral pH as compared to other redox flow battery electrolytes. Accordingly, IFB systems may reduce environmental hazards as compared with all other current advanced redox flow battery systems in production.

Continuing with FIG. 1, a schematic illustration of the redox flow battery system 10 is shown. The redox flow battery system 10 may include the redox flow battery cell 18 fluidly coupled to an integrated multi-chambered electrolyte storage tank 110. The redox flow battery cell 18 may include the negative electrode compartment 20, separator 24, and positive electrode compartment 22. The separator 24 may include an electrically insulating ionic conducting barrier which prevents bulk mixing of the positive electrolyte and the negative electrolyte while allowing conductance of specific ions therethrough. For example, and as discussed above, the separator 24 may include an ion-exchange membrane and/or a microporous membrane.

The negative electrode compartment 20 may include the negative electrode 26, and the negative electrolyte may include electroactive materials. The positive electrode compartment 22 may include the positive electrode 28, and the positive electrolyte may include electroactive materials. In some examples, multiple redox flow battery cells 18 may be combined in series or in parallel to generate a higher voltage or electric current in the redox flow battery system 10.

Further illustrated in FIG. 1 are negative and positive electrolyte pumps 30 and 32, both used to pump electrolyte solution through the redox flow battery system 10. Electrolytes are stored in one or more tanks external to the cell, and are pumped via the negative and positive electrolyte pumps 30 and 32 through the negative electrode compartment 20 side and the positive electrode compartment 22 side of the redox flow battery cell 18, respectively.

The redox flow battery system 10 may also include a first bipolar plate 36 and a second bipolar plate 38, each positioned along a rear-facing side, e.g., opposite of a side facing the separator 24, of the negative electrode 26 and the positive electrode 28, respectively. The first bipolar plate 36 may be in contact with the negative electrode 26 and the second bipolar plate 38 may be in contact with the positive electrode 28. In other examples, however, the bipolar plates 36 and 38 may be arranged proximate but spaced away from the electrodes 26 and 28 and housed within the respective electrode compartments 20 and 22. In either case, the bipolar plates 36 and 38 may be electrically coupled to the terminals 40 and 42, respectively, either via direct contact therewith or through the negative and positive electrodes 26 and 28, respectively. The IFB electrolytes may be transported to reaction sites at the negative and positive electrodes 26 and 28 by the first and second bipolar plates 36 and 38, resulting from conductive properties of a material of the bipolar plates 36 and 38. Electrolyte flow may also be assisted by the negative and positive electrolyte pumps 30 and 32, facilitating forced convection through the redox flow battery cell 18. Reacted electrochemical species may also be directed away from the reaction sites by a combination of forced convection and a presence of the first and second bipolar plates 36 and 38.

In some examples, one or both of the bipolar plates 36 and 38 may be formed from a carbon-based material (such as graphite or a graphite composite material) and bound by a binder [such as a resin, e.g., a polyethylene (PE) resin]. For instance, the graphite composite material may be shaped into a given bipolar plate via a compression molding process or an injection molding process. As a result of the molding process, a resin rich layer may form at an outer surface of the given bipolar plate, e.g., on upper and/or lower surfaces thereof (the lower surface being opposite to the upper surface and each of the upper and lower surfaces extending in planes perpendicular to a thickness of the bipolar plate). The resin rich layer may be undesirable for electrochemical performance, the layer contributing to relatively high resistance and relatively low conductivity. Further, if the resin rich layer is included in the first bipolar plate 36 (in the negative electrode compartment 20) without subsequent treatment, the layer may further contribute to relatively poor plating quality and capacity. For example, $Fe^0$ plated on a pristine (e.g., untreated) bipolar plate including such a resin rich layer may crack and flake, potentially resulting in clogs, or may be uneven, potentially resulting in damaged membranes (e.g., the separator 24) and shorting due to $Fe^0$ accumulation and dendrite formation over extended cycling.

To mitigate such plating issues, as well as to prevent electrochemical performance losses, a continuous surface morphology of the resin rich layer may be disrupted via pretreatment of the first bipolar plate 36 prior to charge cycling of the redox flow battery cell 18. As used herein, "continuous" when describing a surface morphology may refer to a substantially smooth and uninterrupted surface ("substantially" may be used herein as a qualifier meaning "effectively"). In contrast, "disrupted" when describing a surface morphology may refer to a surface having been substantially pitted, conditioned, etched, roughened, coarsened, cracked, incised, abraded, textured, or otherwise deformed (accordingly, cracking may be desirable under select conditions, such as when cracking is limited to the resin rich layer and does not result in flaking of the resin rich layer or plating thereon). Further, "pristine" when describing a given bipolar plate configuration may refer to a bipolar plate being formed (e.g., from compression or injection molding) without any subsequent treatment prior to undergoing charge cycling in a given redox flow battery system. In contrast, "pretreated" when describing a given bipolar plate configuration may refer to post-formation treatment to disrupt or otherwise condition a surface morphology of the bipolar plate for improved electrochemical performance and/or structural integrity (the post-formation treatment being performed prior to the bipolar plate undergoing charge cycling in a given redox flow battery system, hence "pretreated").

The pretreatment may be a mechanical pretreatment, such as abrasion, grinding, polishing, sand blasting, sand paper polishing, a timing belt, and/or other manual or automated mechanical pretreatments that scrape, scratch, or otherwise abrade one or more surfaces of a bipolar plate being pretreated. However, though such mechanical pretreatments may mitigate some electrochemical performance losses in certain cases, long-term durability may be difficult to sustain (e.g., due to uneven plating leading to dendritic formation, etc.). For example, imprecise mechanical pretreatment may lead to small flakes, particulates, or other debris which must be removed prior to inclusion of the pretreated bipolar plate in a battery environment. Such debris removal constitutes extra processing time, cost, and complexity, and, if incomplete, may leave small amounts of the debris at one or more surfaces of the pretreated bipolar plate which may be detrimental to battery operation.

Accordingly, embodiments are provided herein to both mitigate electrochemical performance losses and retain long-term durability via pretreating bipolar plates (e.g., first bipolar plate 36) for plating electrodes (e.g., negative electrode 26) of redox flow battery systems (e.g., redox flow battery system 10). In an exemplary embodiment, and as described in detail below with reference to FIGS. 2A and 2B, a bipolar plate may be pretreated by inducing disruption of at least one surface of the bipolar plate with a press, e.g., a heat press. Specifically, in such an embodiment, the bipolar plate may be sandwiched between imprint plates (e.g., upper and lower imprint plates in direct contact with the upper and lower surfaces of the bipolar plate, respectively) to form a sandwiched bipolar plate configuration and pressing the sandwiched bipolar plate configuration in the press to respectively indent at least one surface of the bipolar plate with patterning of at least one of the imprint plates. Following the pressing, the imprint plates may be removed from the now pretreated and surface disrupted bipolar plate. Thereafter, the pretreated and surface disrupted bipolar plate may be positioned in a redox flow battery system, whereupon undergoing charge cycling, the pretreated and surface disrupted bipolar plate may induce uniform plating and substantially consistent plating performance over a useful life of the redox flow battery system [as used herein, "uniform" when referring to plating or a given surface feature or property may refer to a substantially similar coverage, consistency, and/or depth thereof on a given surface or on any threshold portion of the given surface (for example, the threshold portion may include a total surface area of the given surface or less than the total surface area of the given surface)]. In this way, long-term durability and processing issues associated with certain mechanical pretreatment processes for bipolar plates may be obviated without sacrificing electrochemical performance via substitution of such processes with pressing induced surface disruption.

Continuing with FIG. 1, the redox flow battery cell 18 may further include the negative battery terminal 40 and the positive battery terminal 42. When a charge current is applied to the battery terminals 40 and 42, the positive electrolyte may be oxidized (loses one or more electrons) at the positive electrode 28, and the negative electrolyte may be reduced (gains one or more electrons) at the negative electrode 26. During battery discharge, reverse redox reactions may occur on the electrodes 26 and 28. In other words, the positive electrolyte may be reduced (gains one or more electrons) at the positive electrode 28, and the negative electrolyte may be oxidized (loses one or more electrons) at the negative electrode 26. An electrical potential difference across the battery may be maintained by the electrochemical redox reactions in the positive electrode compartment 22 and the negative electrode compartment 20, and may induce an electric current through a current collector while the reactions are sustained. An amount of energy stored by a redox battery may be limited by an amount of electroactive material available in electrolytes for discharge, depending on a total volume of electrolytes and a solubility of the electroactive materials.

The redox flow battery system 10 may further include the integrated multi-chambered electrolyte storage tank 110. The multi-chambered electrolyte storage tank 110 may be divided by a bulkhead 98. The bulkhead 98 may create multiple chambers within the multi-chambered electrolyte storage tank 110 so that both the positive and negative electrolytes may be included within a single tank. The negative electrolyte chamber 50 holds negative electrolyte including the electroactive materials, and the positive electrolyte chamber 52 holds positive electrolyte including the electroactive materials. The bulkhead 98 may be positioned within the multi-chambered electrolyte storage tank 110 to yield a desired volume ratio between the negative electrolyte chamber 50 and the positive electrolyte chamber 52. In one example, the bulkhead 98 may be positioned to set a volume ratio of the negative and positive electrolyte chambers 50 and 52 according to a stoichiometric ratio between the negative and positive redox reactions. FIG. 1 further illustrates a fill height 112 of the multi-chambered electrolyte storage tank 110, which may indicate a liquid level in each tank compartment. FIG. 1 also shows a gas head space 90 located above the fill height 112 of the negative electrolyte chamber 50, and a gas head space 92 located above the fill height 112 of the positive electrolyte chamber 52. The gas head space 92 may be utilized to store $H_2$ gas generated through operation of the redox flow battery (e.g., due to proton reduction and iron corrosion side reactions) and conveyed to the multi-chambered electrolyte storage tank 110 with returning electrolyte from the redox flow battery cell 18. The $H_2$ gas may be separated spontaneously at a gas-liquid interface (e.g., the fill height 112) within the multi-chambered electrolyte storage tank 110, thereby precluding having additional gas-liquid separators as part of the redox flow battery system 10. Once separated from the electrolyte, the $H_2$ gas may fill the gas head spaces 90 and 92. As such, the stored $H_2$ gas may aid in purging other gases from the multi-chambered electrolyte storage tank 110, thereby acting as an inert gas blanket for reducing oxidation of electrolyte species, which may help to reduce redox flow battery capacity losses. In this way, utilizing the integrated multi-chambered electrolyte storage tank 110 may forego having separate negative and positive electrolyte storage tanks, hydrogen storage tanks, and gas-liquid separators common to conventional redox flow battery systems, thereby simplifying a system design, reducing a physical footprint of the redox flow battery system 10, and reducing system costs.

FIG. 1 also shows a spillover hole 96, which may create an opening in the bulkhead 98 between the gas head spaces 90 and 92, and may provide a means of equalizing gas pressure between the chambers 50 and 52. The spillover hole 96 may be positioned at a threshold height above the fill height 112. The spillover hole 96 may further enable a capability to self-balance the electrolytes in each of the negative and positive electrolyte chambers 50 and 52 in the event of a battery crossover. In the case of an all-iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but overall electrolyte composition, battery module performance, and battery module capacity may be maintained. Flange fittings may be utilized for all piping connections for inlets and outlets to and from the multi-chambered electrolyte storage tank 110 to maintain a continuously pressurized state without leaks. The multi-chambered electrolyte storage tank 110 may include at least one outlet from each of the negative and positive electrolyte chambers 50 and 52, and at least one inlet to each of the negative and positive electrolyte chambers 50 and 52. Furthermore, one or more outlet connections may be provided from the gas head spaces 90 and 92 for directing $H_2$ gas to rebalancing reactors or cells 80 and 82.

Although not shown in FIG. 1, the integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers 50 and 52 may include one or more heaters. In the case where only the positive electrolyte chamber 52 includes one or more heaters, the negative electrolyte may be heated by transferring heat generated at the redox flow battery cell 18 to the negative electrolyte. In this way, the redox flow battery cell 18 may heat and facilitate temperature regulation of the negative electrolyte. The one or more heaters may be actuated by a controller 88 to regulate a temperature of the negative electrolyte chamber 50 and the positive electrolyte chamber 52 independently or together. For example, in response to an electrolyte temperature decreasing below a threshold temperature, the controller 88 may increase a power supplied to one or more heaters so that a heat flux to the electrolyte may be increased. The electrolyte temperature may be indicated by one or more temperature sensors mounted at the multi-chambered electrolyte storage tank 110, such as sensors 60 and 62. As examples, the one or more heaters may include coil type heaters or other immersion heaters immersed in the electrolyte fluid, or surface mantle type heaters that transfer heat conductively through the walls of the negative and positive electrolyte chambers 50 and 52 to heat the fluid therein. Other known types of tank heaters may be employed without departing from the scope of the present disclosure. Furthermore, the controller 88 may deactivate the one or more heaters in the negative and positive electrolyte chambers 50 and 52 in response to a liquid level decreasing below a solids fill threshold level. Said in another way, in some examples, the controller 88 may activate the one or more heaters in the negative and positive electrolyte chambers 50 and 52 only in response to a liquid level increasing above the solids fill threshold level. In this way, activating the one or more heaters without sufficient liquid in the negative and/or positive electrolyte chambers 50, 52 may be averted, thereby reducing a risk of overheating or burning out the heater(s).

Further still, one or more inlet connections may be provided to each of the negative and positive electrolyte chambers 50 and 52 from a field hydration system (not shown). In this way, the field hydration system may facilitate commissioning of the redox flow battery system 10, including installing, filling, and hydrating the redox flow battery system 10, at an end-use location. Furthermore, prior to commissioning the redox flow battery system 10 at the end-use location, the redox flow battery system 10 may be dry-assembled at a battery manufacturing facility different from the end-use location without filling and hydrating the redox flow battery system 10, before delivering the redox flow battery system 10 to the end-use location. In one example, the end-use location may correspond to a location where the redox flow battery system 10 is to be installed and utilized for on-site energy storage. Said another way, the redox flow battery system 10 may be designed such that, once installed and hydrated at the end-use location, a position of the redox flow battery system 10 may become fixed, and the redox flow battery system 10 may no longer be deemed a portable, dry system. Thus, from a perspective of an end-user, the dry, portable redox flow battery system 10 may be delivered on-site, after which the redox flow battery system 10 may be installed, hydrated, and commissioned. Prior to hydration, the redox flow battery system 10 may be referred to as a dry, portable system, the redox flow battery system 10 being free of or without water and wet electrolyte. Once hydrated, the redox flow battery system 10 may be referred to as a wet, non-portable system, the redox flow battery system 10 including wet electrolyte.

Further illustrated in FIG. 1, electrolyte solutions primarily stored in the multi-chambered electrolyte storage tank 110 may be pumped via the negative and positive electrolyte pumps 30 and 32 throughout the redox flow battery system 10. Electrolyte stored in the negative electrolyte chamber 50 may be pumped via the negative electrolyte pump 30 through the negative electrode compartment 20 side of the redox flow battery cell 18, and electrolyte stored in the positive electrolyte chamber 52 may be pumped via the positive electrolyte pump 32 through the positive electrode compartment 22 side of the redox flow battery cell 18.

The electrolyte rebalancing reactors 80 and 82 may be connected in line or in parallel with the recirculating flow paths of the electrolyte at the negative and positive sides of the redox flow battery cell 18, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in a return flow path from the negative and positive electrode compartments 20 and 22 to the negative and positive electrolyte chambers 50 and 52, respectively.

The electrolyte rebalancing reactors 80 and 82 may serve to rebalance electrolyte charge imbalances in the redox flow battery system 10 occurring due to side reactions, ion crossover, and the like, as described herein. In one example, electrolyte rebalancing reactors 80 and 82 may include trickle bed reactors, where the $H_2$ gas and electrolyte may be contacted at catalyst surfaces in a packed bed for carrying out the electrolyte rebalancing reaction. In other examples, the rebalancing reactors 80 and 82 may include flow-through type reactors that are capable of contacting the $H_2$ gas and the electrolyte liquid and carrying out the electrolyte rebalancing reactions absent a packed catalyst bed.

During operation of the redox flow battery system 10, sensors and probes may monitor and control chemical properties of the electrolyte such as electrolyte pH, concentration, SOC, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. In another example, sensors 62 and 60 may each include one or more electrolyte level sensors to indicate a level of electrolyte in the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. The sensors 72 and 70 may be pH probes, optical probes, pressure sensors, voltage sensors, etc. It will be appreciated that sensors may be positioned at other locations throughout the redox flow battery system 10 to monitor electrolyte chemical properties and other properties.

For example, a sensor may be positioned in an external acid tank (not shown) to monitor acid volume or pH of the external acid tank, wherein acid from the external acid tank may be supplied via an external pump (not shown) to the redox flow battery system 10 in order to reduce precipitate formation in the electrolytes. Additional external tanks and sensors may be installed for supplying other additives to the redox flow battery system 10. For example, various sensors including, temperature, conductivity, and level sensors of a field hydration system may transmit signals to the controller 88. Furthermore, the controller 88 may send signals to actuators such as valves and pumps of the field hydration system during hydration of the redox flow battery system 10. Sensor information may be transmitted to the controller 88 which may in turn actuate the pumps 30 and 32 to control electrolyte flow through the redox flow battery cell 18, or to perform other control functions, as an example. In this manner, the controller 88 may be responsive to one or a combination of sensors and probes.

The redox flow battery system 10 may further include a source of $H_2$ gas. In one example, the source of $H_2$ gas may include a separate dedicated hydrogen gas storage tank. In the example of FIG. 1, $H_2$ gas may be stored in and supplied from the integrated multi-chambered electrolyte storage tank 110. The integrated multi-chambered electrolyte storage tank 110 may supply additional $H_2$ gas to the positive electrolyte chamber 52 and the negative electrolyte chamber 50. The integrated multi-chambered electrolyte storage tank 110 may alternately supply additional $H_2$ gas to an inlet of the electrolyte rebalancing reactors 80 and 82. As an example, a mass flow meter or other flow controlling device (which may be controlled by the controller 88) may regulate flow of the $H_2$ gas from the integrated multi-chambered electrolyte storage tank 110. The integrated multi-chambered electrolyte storage tank 110 may supplement the $H_2$ gas generated in the redox flow battery system 10. For example, when gas leaks are detected in the redox flow battery system 10 or when a reduction reaction rate is too low at low hydrogen partial pressure, the $H_2$ gas may be supplied from the integrated multi-chambered electrolyte storage tank 110 in order to rebalance the SOC of the electroactive materials in the positive electrolyte and the negative electrolyte. As an example, the controller 88 may supply the $H_2$ gas from the integrated multi-chambered electrolyte storage tank 110 in response to a measured change in pH or in response to a measured change in SOC of an electrolyte or an electroactive material.

For example, an increase in pH of the negative electrolyte chamber 50, or the negative electrode compartment 20, may indicate that $H_2$ gas is leaking from the redox flow battery system 10 and/or that the reaction rate is too slow with the available hydrogen partial pressure, and the controller 88, in response to the pH increase, may increase a supply of $H_2$ gas from the integrated multi-chambered electrolyte storage tank 110 to the redox flow battery system 10. As a further example, the controller 88 may supply $H_2$ gas from the integrated multi-chambered electrolyte storage tank 110 in response to a pH change, wherein the pH increases beyond a first threshold pH or decreases beyond a second threshold pH. In the case of an IFB, the controller 88 may supply additional $H_2$ gas to increase a rate of reduction of $Fe^{3+}$ ions and a rate of production of protons, thereby reducing the pH of the positive electrolyte. Furthermore, the pH of the negative electrolyte may be lowered by hydrogen reduction of $Fe^{3+}$ ions crossing over from the positive electrolyte to the negative electrolyte or by protons, generated at the positive side, crossing over to the negative electrolyte due to a proton concentration gradient and electrophoretic forces. In this manner, the pH of the negative electrolyte may be maintained within a stable region, while reducing the risk of precipitation of $Fe^{3+}$ ions (crossing over from the positive electrode compartment 22) as $Fe(OH)_3$.

Other control schemes for controlling a supply rate of $H_2$ gas from the integrated multi-chambered electrolyte storage tank 110 responsive to a change in an electrolyte pH or to a change in an electrolyte SOC, detected by other sensors such as an oxygen-reduction potential (ORP) meter or an optical sensor, may be implemented. Further still, the change in pH or SOC triggering action of the controller 88 may be based on a rate of change or a change measured over a time period. The time period for the rate of change may be predetermined or adjusted based on time constants for the redox flow battery system 10. For example, the time period may be reduced if a recirculation rate is high, and local changes in concentration (e.g., due to side reactions or gas leaks) may quickly be measured since the time constants may be small.

The controller 88 may further execute control schemes based on an operating mode of the redox flow battery system 10. For example, and as discussed below with reference to FIG. 2A, the controller 88 may command charge cycling of the redox flow battery cell 18 to uniformly plate the negative electrode 26. As discussed above, in one example, uniform plating of the negative electrode may be facilitated by the surface disrupted first bipolar plate 36 (e.g., following mechanical pretreatment thereof; see FIG. 2B). As another example, the controller 88 may further control charging and discharging of the redox flow battery cell 18 so as to cause iron preformation at the negative electrode 26 during system conditioning (where system conditioning may include an operating mode employed to optimize electrochemical performance of the redox flow battery system 10 outside of battery cycling). That is, during system conditioning, the controller 88 may adjust one or more operating conditions of the redox flow battery system 10 to plate iron metal on the negative electrode 26 to improve a battery charge capacity during subsequent battery cycling (thus, the iron metal may be preformed for battery cycling). The controller 88 may further execute electrolyte rebalancing as discussed above to rid the redox flow battery system 10 of excess hydrogen gas and reduce $Fe^{3+}$ ion concentration. In this way, preforming iron at the negative electrode 26 and running electrolyte rebalancing during the system conditioning may increase an overall capacity of the redox flow battery cell 18 during battery cycling by mitigating iron plating loss. As used herein, battery cycling (also referred to as "charge cycling") may include alternating between a charging mode and a discharging mode of the redox flow battery system 10.

It will be appreciated that all components apart from the sensors 60 and 62 and the integrated multi-chambered electrolyte storage tank 110 (and components included therein) may be considered as being included in a power module 120. As such, the redox flow battery system 10 may be described as including the power module 120 fluidly coupled to the integrated multi-chambered electrolyte storage tank 110 and communicably coupled to the sensors 60 and 62. In some examples, each of the power module 120 and the multi-chambered electrolyte storage tank 110 may be included in a single housing (not shown), such that the redox flow battery system 10 may be contained as a single unit in a single location. It will further be appreciated the positive electrolyte, the negative electrolyte, the sensors 60 and 62, the electrolyte rebalancing reactors 80 and 82, and the integrated multi-chambered electrolyte storage tank 110 (and components included therein) may be considered as being included in an electrolyte subsystem 130. As such, the electrolyte subsystem 130 may supply one or more electrolytes to the redox flow battery cell 18 (and components included therein).

Referring now to FIGS. 2A and 2B, a flow chart of a method 200 for preparing and operating a redox flow battery system including a surface disrupted bipolar plate and a flow chart of a method 250 for pretreating the bipolar plate for use with the redox flow battery system, including disrupting at least one surface of the bipolar plate via pressing, are respectively shown. In an exemplary embodiment, the redox flow battery system and the surface disrupted bipolar plate may respectively be the redox flow battery system 10 and the first bipolar plate 36 described in detail above with reference to FIG. 1. Further components described with reference to FIGS. 2A and 2B may be examples of corresponding components of the redox flow battery system 10 of FIG. 1. Accordingly, each of methods 200 and 250 may be considered with reference to the embodiments of FIG. 1 (though it may be understood that similar methods may be applied to other systems without departing from the scope of the present disclosure). For example, at least some steps of methods 200 and 250 (such as steps involved in plating preformation and charge cycling of the redox flow battery system) may be carried out via the controller 88, and may be stored as executable instructions at a non-transitory storage medium (e.g., memory) communicably coupled to the controller 88.

Referring now to FIG. 2A, at 202, method 200 includes forming a pristine bipolar plate. In one example, a graphite composite starting material (e.g., including graphite or a graphite composite material bound by a resin binder) may be compression molded or injection molded so as to form the pristine bipolar plate. As a result of the molding, however, a resin rich layer may be formed on outer surfaces of the molded graphite composite starting material. The resin rich layer may be undesirable from an electrochemical perspective, potentially resulting in high resistance, poor conductivity, and poor plating upon inclusion of the pristine bipolar plate in the redox flow battery system. In other examples, the pristine bipolar plate may be formed from a graphite composite of a thermoset resin or a thermoplastic resin, such as one or more of polypropylene, polyethylene, polyvinylchloride, and vinyl ester resin. In such examples, electrochemical performance of the redox flow battery system including the pristine bipolar plate may be similarly poor.

Accordingly, at 204, method 200 includes disrupting at least one surface of the pristine bipolar plate, where the at least one surface of the pristine bipolar plate may include the resin rich layer. In some examples, disrupting the at least one surface may include mechanically wearing down the resin rich layer, e.g., via scratching or scraping. However, such mechanical wearing may be imprecise in terms of both a resultant surface morphology and an amount of excess residue remaining on the bipolar plate following the mechanical wearing. Addressing such issues may result in extra processing steps, thereby increasing processing time, complexity, and cost.

As an alternative to such mechanical wearing, the at least one surface may be disrupted or altered via pressing of at least one imprint plate respectively thereto, such that the bipolar plate may be pretreated for the redox flow battery system. In some examples, and as described in greater detail below with reference to method 250 of FIG. 2B, the disruption may include uniform roughening and texturing of each surface pressed against a corresponding imprint plate with a pattern of asymmetric protrusions (e.g., formed as a negative indentation of a pattern of the corresponding imprint plate). As one embodiment, method 250 of FIG. 2B may partially or wholly substitute 204. However, it will be appreciated that method 250 of FIG. 2B constitutes one exemplary embodiment of pressing induced surface disruption and that additional or alternative embodiments of pretreatment methods may be implemented within the scope of this disclosure.

In an exemplary embodiment, the bipolar plate may be sandwiched between a pair of imprint plates to form a sandwiched bipolar plate configuration, at least one of the pair of imprint plates including a pattern (e.g., an arrangement of ridges or other protrusions having openings or other depressions therebetween). The sandwiched bipolar plate configuration may be positioned between a pair of platens in a press, such as a heat press, wherewith the sandwiched bipolar plate configuration may be pressed above each of a threshold pressing pressure and a threshold pressing temperature for at least a threshold pressing duration. In some examples, the press may be a heat press, operable to heat the pair of platens to greater than room temperature. In other examples, other types of presses may be used (e.g., presses which are not configured to be actively heated). After removing the sandwiched bipolar plate configuration from the press, any surface of the bipolar plate in direct contact with an imprint plate including a pattern may include a negative indentation of the pattern (e.g., depressions on the surface may correspond to the ridges or other protrusions of the pattern and ridges or other protrusions on the surface may correspond to the openings or other depressions of the pattern). Accordingly, such surface(s) may be uniformly roughened and textured at Ra>3.5 µm following the pressing.

The pair of imprint plates may be removed prior to positioning the surface disrupted bipolar plate in the redox flow battery system. Upon removal of the pair of imprint plates, the surface disrupted bipolar plate may be free (e.g., substantially free) of debris (e.g., particulates and flakes). In this way, surface disruption of the bipolar plate via pressing may maintain or improve long-term durability of machining parts used in pretreating the bipolar plate relative to certain other mechanical wearing pretreatments (e.g., involving scratching or scraping the at least one surface of the bipolar plate including the resin rich layer). Further, disruption of a morphology of the resin rich layer of the bipolar plate may result in more uniform plating and/or increased conductivity, and thereby improved electrochemical performance, across extended cycling of a redox flow battery system including the bipolar plate relative to redox flow battery systems including pristine bipolar plates or imprecisely mechanically pretreated bipolar plates.

At 206, method 200 includes preforming plating on the negative (plating) electrode of the redox flow battery system including the pretreated bipolar plate, e.g., having the disrupted resin rich layer. Plating preformation may be desirable to increase an overall capacity of the redox flow battery system during battery cycling by ensuring sufficient plating on the negative electrode is provided to support an entire electrical load towards an end of discharging. In some examples, plating preformation may be realized by charging the redox flow battery system at a set point or to a desired SOC. For instance, the desired SOC may be 15% in one example. In an exemplary embodiment, the redox flow battery system may be an all-iron hybrid redox flow battery system, and the plating may be $Fe^0$ plating resulting from reduction of $Fe^{2+}$ at the negative electrode during battery charging.

At 208, method 200 includes initiating charge cycling of the redox flow battery system including the pretreated bipolar plate. In an exemplary embodiment where the bipolar plate is surface disrupted as described above and positioned in a negative electrode compartment of the redox flow battery system, extended charge cycling of the redox flow battery system may result in uniform plating. Further, in such embodiments, metal plating formed on any disrupted surface of the bipolar plate during the charge cycling may include less cracking and fewer free particulates and flakes than a bipolar plate with surfaces each having a roughness with Ra≤10 µm. Accordingly, issues associated with poor plating (e.g., resulting in cracking or flaking and related clogging and poor electrochemical performance) or uneven plating (e.g., resulting in dendritic formation and related membrane damage and shorting) may be obviated. In this way, a redox flow battery system may be prepared and operated with a surface disrupted bipolar plate so as to mitigate electrochemical performance loss without sacrificing long-term durability.

Referring now to FIG. 2B, at 252, method 250 includes obtaining a pristine bipolar plate (e.g., without disruptions to surfaces thereof). In an exemplary embodiment, the bipolar plate may be formed as described in detail above at 202 of FIG. 2A. As one non-limiting example, the bipolar plate may be formed by injection molding or compression molding a graphite composite starting material. As such, at least one surface of the bipolar plate may include a resin rich layer which, left pristine and undisrupted, may contribute to high resistance, low conductivity, and poor plating upon inclusion of the bipolar plate in the redox flow battery system. For example, the bipolar plate may include upper and lower surfaces parallel to and opposite from one another, each of the upper and lower surfaces including the resin rich layer.

The upper and lower surfaces may independently correspond to positive and negative sides of the bipolar plate, with plating occurring on the negative side when the bipolar plate is included in a redox flow battery system. For example, when the redox flow battery system is an all-iron hybrid redox flow battery system, $Fe^{2+}$ may be plated as $Fe^0$ (see equation (4)) on the negative side of the bipolar plate during charging of the redox flow battery system, while the positive side of the bipolar plate may be in direct or indirect contact with a felt electrode (whereat $Fe^{2+}$ is oxidized to $Fe^{3+}$ during charging; see equation (5)). Further, during charging, electrons may flow from the positive side to the negative side, so as to reduce $Fe^{2+}$ for plating. During discharging, reverse reactions occur, with $Fe^0$ plating being re-dissolved as $Fe^{2+}$ (see equation (4)) and $Fe^{3+}$ being reduced to $Fe^{2+}$ (see equation (5)). As such, in some examples, the bipolar plate may be in direct fluidic contact with both a positive electrode (e.g., the felt electrode) and a negative electrode.

To mitigate electrochemical performance issues, the upper and lower surfaces of the bipolar plate may be respectively pressed against upper and lower imprint plates via a press (e.g., a heat press) such that at least a portion of each resin rich layer may be disrupted for improved plating relative to pristine and undisrupted resin rich layers. In this way, the upper and lower surfaces of the bipolar plate including the resin rich layers may be disrupted so as reduce/roughen the resin rich layer for lowered resistance and increased conductivity (on both the positive and negative sides) and improved plating during charging of the redox flow battery system including the surface disrupted bipolar plate. By respectively pressing the upper and lower surfaces of the bipolar plates against the upper and lower imprint plates via the press, surface disruption may be achieved without excess flakes, particulates, or other debris (which may, in contrast, be unavoidable with other mechanical pretreatment methods). Further, as each of the upper and lower imprint plates may be configured in any of a variety of patterned structures, an extent, a precision, and a uniformity of surface disruption may be easily adjusted by selecting or combining different imprint plate configurations.

In an exemplary embodiment, a thickness of the (pristine) bipolar plate (e.g., a distance between the upper and lower surfaces and extending perpendicular to a plane parallel to the upper and lower surfaces) may be between 0.9 and 2.1 mm. In one example, the thickness may be about 1.5 mm (as used herein, "about" when referring to a numerical value may encompass a deviation of 5% or less). The thickness of the bipolar plate may be reduced following disruption of the upper and lower surfaces.

At 254, method 250 includes positioning (e.g., sandwiching) the bipolar plate between the upper and lower imprint plates to form a sandwiched bipolar plate configuration. Specifically, the upper imprint plate may be positioned in face-sharing contact with the upper surface of the bipolar plate and the lower imprint plate may be positioned in face-sharing contact with the lower surface of the bipolar plate. Prior to pressing (e.g., upon formation of the sandwiched bipolar plate configuration), the upper and lower surfaces of the bipolar plate may be smooth and unabraded (e.g., having a roughness with Ra<2 µm). In some embodiments, the upper and lower imprint plates may be independently formed from titanium, steel, ceramic, aluminum, or a combination thereof. However, it will be appreciated that the upper and lower imprint plates are not limited to the aforementioned materials and may be independently formed from any material having each of a hardness and a compressive strength sufficient to disrupt the upper and lower surfaces of the bipolar plate during operation of the press (see below at 260).

In some embodiments, one or both of the upper and lower imprint plates may be patterned. In an exemplary embodiment, each of the upper and lower imprint plates may be patterned with the same pattern. In other embodiments, the upper and lower imprint plates may be patterned with different patterns, or only one of the upper and lower imprint plates may be patterned and the other one of the upper and lower imprint plates may be smooth, unabraded, and unpatterned.

In some embodiments, each of the upper and lower imprint plates may be a patterned mesh. As used herein, "patterned mesh" may refer to a grid or open framework including a configuration of a plurality of spaces, openings, and/or other depressions symmetrically or asymmetrically dispersed among a symmetric or asymmetric arrangement of a plurality of ridges, beams, wires, fibers, and/or other physical delimiters or protrusions. As an example, the patterned mesh may be a grid or open framework including a repeating pattern of the plurality of spaces, openings, and/or other depressions delimited by the plurality of ridges, beams, wires, fibers, and/or other physical delimiters or protrusions. As another example, the patterned mesh may be a grid or open framework including a non-repeating pattern of the plurality of spaces, openings, and/or other depressions delimited by the plurality of ridges, beams, wires, fibers, and/or other physical delimiters or protrusions. However, the plurality of spaces, openings, and/or other depressions and the plurality of ridges, beams, wires, fibers, and/or other physical delimiters or protrusions are arranged, the patterned mesh may not be continuously smooth (e.g., the patterned mesh may include roughened, textured, or otherwise interrupted faces). In an exemplary embodiment, the patterned mesh may include a grid of delimiting rows and columns, each of the rows parallel to one another, each of the channels parallel to one another, and each of the rows perpendicular to each of the columns, with openings or spaces between adjacent rows and adjacent columns (as used herein, "adjacent" may describe any two components having no intervening components therebetween).

In an exemplary embodiment, the press which is to perform the pressing (and corresponding surface disruption) of the bipolar plate may be a heat press. In such an embodiment, and as discussed below, the heat press may press the sandwiched bipolar plate configuration based on one or more controllable pressing conditions, such as a pressing pressure, a pressing temperature, and/or a pressing duration. For example, the heat press may press the sandwiched bipolar plate configuration at the pressing pressure and the pressing temperature for the pressing duration. The pressing pressure, the pressing temperature, and the pressing duration may be selected so as to efficiently disrupt the surface of the bipolar plate (e.g., from a perspective of energy and/or time consumed). Accordingly, each of the pressing pressure, the pressing temperature, and the pressing duration selected to generate a threshold amount of surface disruption/roughness may depend on one another. As an example, with increasing pressing temperature, decreasing pressing pressure may achieve similar surface disruption for a given pressing duration. As another example, with increasing pressing pressure, decreasing pressing temperature may achieve similar surface disruption for a given pressing duration. As another example, with increasing pressing pressure and/or increasing pressing temperature, a shorter pressing duration may achieve similar surface disruption as compared to a longer pressing duration at a lower pressing pressure and/or a lower pressing temperature.

Accordingly, at 256, method 250 may optionally include preheating the heat press to the pressing temperature. Specifically, the heat press may be switched to an ON (operational) state from an OFF (non-operational or idle) state, whereby a temperature of the heat press may be ramped up to the pressing temperature from a cooler temperature, e.g., room temperature. In an exemplary embodiment, the pressing temperature may be a predetermined temperature selected by an operator of the heat press greater than a threshold pressing temperature selected for a given pressing pressure and a given pressing duration (e.g., a temperature sufficient, at the given pressing pressure, to permit disruption of the upper and lower surfaces of the bipolar plate during operation of the heat press for the given pressing duration).

In some embodiments, the pressing pressure may be selected sufficiently high such that the pressing temperature may be decreased to room temperature (e.g., the pressing temperature may be at least 20° C.). In such embodiments, the press may not be the heat press, or the heat press may be used without heating thereof. Accordingly, in FIG. 2B, 256 is indicated in dashing, as preheating of the heat press may be optional (e.g., or may be obviated, if the press is not a heat press).

Additionally or alternatively, the pressing pressure, the pressing temperature, and the pressing duration may depend on a composition of the bipolar plate. Specifically, because the bipolar plate may be formed from various compositions (e.g., various different graphite composite starting materials bound with various resins), a compressive yield strength of the bipolar plate may fall within a range of values. As such, bipolar plates formed from compositions having relatively low compressive yield strength may be surface disrupted with correspondingly decreased pressing pressure, decreased pressing temperature, and/or decreased pressing duration. For example, when the bipolar plate is formed from a composition with a sufficiently low compressive yield strength, the pressing temperature may be room temperature (e.g., no heating or preheating may be employed during the pressing). One such composition for which room temperature may be employed for the (unheated) pressing may include a polyethylene resin. Alternatively, a relatively high pressing temperature and/or a relatively high pressing pressure may reduce and/or overcome the compressive yield strength of the bipolar plate (e.g., by disrupting/breaking polymer chains therein), thereby lowering the pressing pressure sufficient to disrupt the surface(s) of the bipolar plate. In this way, the pressing temperature may fall within a relatively wide range of values, e.g., from as low as 0° C. (in a relatively cold ambient environment) or room temperature (e.g., 20° C.) to as high as a melting temperature of the bipolar plate.

At 258, method 250 includes positioning the sandwiched bipolar plate configuration in the press. Specifically, the sandwiched bipolar plate configuration may be positioned between upper and lower platens of the press, such that the upper imprint may be positioned between the upper surface of the bipolar plate and the upper platen and the lower imprint plate may be positioned between the lower surface of the bipolar plate and the lower platen. Upon positioning, the sandwiched bipolar plate configuration may rest on (e.g., be in contact with) the lower platen and the upper platen may not yet be brought into contact with the sandwiched bipolar plate configuration (e.g., no pressing pressure may yet be applied via the press).

At 260, method 250 includes pressing the sandwiched bipolar plate configuration with the press to disrupt at least one of the upper and lower surfaces of the bipolar plate. Specifically, during the pressing, the upper imprint plate may be positioned between (and in face-sharing contact with each of) the upper surface of the bipolar plate and the upper platen, such that the bipolar plate is not in direct contact with the upper platen, and the lower imprint plate may be positioned between (and in face-sharing contact with each of) the lower surface of the bipolar plate and the lower platen, such that the bipolar plate is not in direct contact with the lower platen. In embodiments wherein each of the upper and lower imprint plates is patterned, each of the upper and lower surfaces may be disrupted via the pressing.

In some embodiments, the pressing may be performed at the pressing temperature greater than the threshold pressing temperature (see above at 256). In some embodiments, the pressing may be performed at a pressing pressure greater than the threshold pressing pressure. In an exemplary embodiment, and as discussed above, the pressing pressure may be a predetermined pressure selected by the operator of the press greater than or equal to the threshold pressing pressure (e.g., a pressure sufficient, at the threshold pressing temperature, to permit disruption of the upper and lower surfaces of the bipolar plate during operation of the press). As an example, the threshold pressing pressure may be a compressive yield strength of the bipolar plate, such that the pressing pressure may overcome the compressive yield strength to disrupt surface(s) of the bipolar plate. As another example, the pressing pressure may be 76.6 MPa (corresponding to about 15.5 kN of applied force, in one example) to overcome a compressive yield strength of 65 MPa.

In an exemplary embodiment, to disrupt the upper and lower surfaces to a threshold roughness (e.g., an Ra value of greater than 10 μm), each of the pressing temperature and the pressing pressure may be maintained for the pressing duration greater than or equal to a threshold pressing duration, the threshold pressing duration being dependent on the pressing temperature, the pressing pressure, and the composition of the bipolar plate (as discussed above). As an example, the pressing duration may range from 0.1 to 60 s. As another example, the pressing duration may be at least 0.2 s (e.g., the threshold pressing duration may be 0.2 s).

At 262, method 250 includes removing the sandwiched bipolar plate configuration from the press. Specifically, the pressing pressure may be released (e.g., reduced to zero) and the press may be switched to the OFF state from the ON state. In examples where an elevated pressing temperature was applied via the heat press, the temperature of the heat press may be cooled from the pressing temperature to a cooler temperature, e.g., room temperature. In such examples, the sandwiched bipolar plate configuration may also cool to a cooler temperature, e.g., room temperature, albeit at a faster rate than the heat press upon removal from the heat press for cooling.

At 264, method 250 includes removing the bipolar plate from the upper and lower imprint plates, at least one of the upper and lower surfaces of the bipolar plate disrupted and respectively indented with patterns from at least one of the upper and lower imprint plates following the pressing. In embodiments wherein each of the upper and lower imprint plates is patterned, the upper and lower surfaces may respectively include negative indentations of the upper and lower imprint plates. In an exemplary embodiment, each of the negative indentations may be patterned as a repeating negative mesh including first channels intersecting with second channels, each of the first channels parallel to one another, each of the second channels parallel to one another, and each of the first channels perpendicular to each of the second channels. In embodiments where the upper and lower imprint plates are patterned meshes, the first channels may be formed by rows of the patterned meshes being respectively pressed into the upper and lower surfaces, and the second channels may be formed by columns of the patterned meshes being respectively pressed into the upper and lower surfaces.

Linear sequences of asymmetric protrusions (similar to mountain ranges in appearance, though not in size) may be retained on the upper and lower surfaces between adjacent pairs of the first channels and between adjacent pairs of the second channels. Accordingly, each of the negative indentations may be alternatively described as a pattern of asymmetric protrusions (e.g., a repeating pattern including a grid of rows and columns of asymmetric protrusions). The asymmetric protrusions may have uniform dimensions to one another (e.g., each of the asymmetric protrusions may have similar height, length, and width to one another, but may not be symmetric in shape). Accordingly, the upper and lower surfaces may be uniformly roughened and textured following the pressing.

In some embodiments, following the pressing, each of the upper and lower surfaces of the bipolar plate may be have a roughness with Ra>3.5 μm. In some embodiments, following the pressing, each of the upper and lower surfaces may have a roughness with Ra>10 μm. In an exemplary embodiment, following the pressing, one or both of the upper and lower surfaces may be roughened at an Ra value of greater than 3.5 μm and less than 100 μm, an Rc value of greater than 12 μm and less than 60 μm, and an Rk value of greater than 8 μm and less than 45 μm. However, it will be appreciated that upper limits to such ranges for the Ra, Rc, and Rk values may be increased beyond 100 μm, 60 μm, and 45 μm, respectively, at least until deformation and disruption of the upper and/or lower surfaces compromises a structural integrity of the bipolar plate. Such surface roughening may be achieved even with substantially no debris on the upper and lower surfaces following the pressing. In an exemplary embodiment, following the pressing, the surface disrupted bipolar plate may be free of debris upon removal of the upper and lower imprint plates. In this way, by pressing the bipolar plate, at least one surface of the bipolar plate may be uniformly and extensively roughened without excess particulates and flakes.

Exemplary subscale parameters for use with the methods 200 and 250 of FIGS. 2A and 2B are provided in Table 1 below, where "subscale" may refer to smaller magnitude values than may be commonly implemented in a redox flow battery system. However, it will be appreciated that arbitrarily larger scale parameters may be employed as long as the press may be sufficiently sized and configured to apply sufficiently high pressing pressure for a given bipolar plate size (with which the pressing pressure may scale).

TABLE 1

Exemplary subscale parameters for pressing a bipolar plate between a pair of imprint plates configured as patterned wire meshes.

| Parameter | Unit | Value |
|---|---|---|
| Length of bipolar plate | mm | 72 |
| Width of bipolar plate | mm | 72 |
| Diameter of each wire | mm | 0.2794 |
| Wires per length/width of bipolar plate | wires/mm | 0.71 |
| Number of wires parallel to length of bipolar plate | wires | 51 |
| Number of wires parallel to width of bipolar plate | wires | 51 |
| Number of contact points | contact points | 2603 |
| Contact point area | mm² | 0.07806 |
| Total area of contact points | mm² | 203.2 |
| Applied force of press | lbf | 3500 |
| | N | 15570 |
| Pressing pressure of press | MPa | 76.61 |

Referring now to FIGS. 3A-3B, first and second perspective views 300, 350 depicting a pristine (e.g., smooth and unabraded) bipolar plate 304 and lower and upper imprint plates 306a, 306b positioned in a heat press 302, and prior to pressing with the heat press 302, are shown. In an exemplary embodiment, the bipolar plate 304 may be prepared for use in a redox flow battery system, such as the redox flow battery system 10 as described in detail above with reference to FIG. 1. For example, the bipolar plate 304 may be formed by injection molding or compression molding a graphite composite starting material. Following formation, the bipolar plate 304 may be pressed between the lower and upper imprint plates 306a, 306b via the heat press 302, such that surfaces of the bipolar plate 304 may be uniformly disrupted prior to use in the redox flow battery system. As shown, each of the lower and upper imprint plates 306a, 306b may be a titanium patterned mesh.

The heat press 302 is depicted in the first and second perspective views 300, 350 prior to applying force via lower platen 308a and upper platen 308b. When the heat press 302 is not applying force, and as shown in the first perspective view 300, a space or gap 312 may be disposed between a surface 310a of the lower platen 308a and a surface 310b of the upper platen 308b. The lower imprint plate 306a may be positioned on the surface of the heat press 302 and the bipolar plate 304 may be positioned on the lower imprint plate 306a. Accordingly, the lower imprint plate 306a may be positioned between the bipolar plate 304 and the surface 310a, such that the bipolar plate 304 may not directly contact the surface 310a. Further, and as shown in the second perspective view 350, the upper imprint plate 306b may be positioned on the bipolar plate 304 opposite to the lower imprint plate 306a, and a sandwiched bipolar plate configuration 352 may be formed by a sequential stacking of the lower imprint plate 306a, the bipolar plate 304, and the upper imprint plate 306b. Upon applying force to the sandwiched bipolar plate configuration 352 via the heat press 302, the space or gap 312 may be decreased as a distance between the lower platen 308a and upper platen 308b is decreased and the upper imprint plate 306b may come into contact with the surface 310b. Accordingly, the upper imprint plate 306b may be positioned between the bipolar plate 304 and the surface 310b, such that the bipolar plate 304 may not directly contact the surface 310b. In some examples, the lower platen 308a and upper platen 308b may be preheated prior to positioning of the sandwiched bipolar plate configuration 352 therebetween.

Referring now to FIG. 4, a top perspective view 400 depicting a pristine bipolar plate 404, lower and upper imprint plates 406a, 406b, and a surface disrupted bipolar plate 454 following pressing thereof between the lower and upper imprint plates 406a, 406b is shown. In an exemplary embodiment, one or both of the pristine bipolar plate 404 and the surface disrupted bipolar plate 454 may be prepared for use with a redox flow battery system, such as the redox flow battery system 10 as described in detail above with reference to FIG. 1. For example, the pristine bipolar plate 404 may be formed by injection molding or compression molding a graphite composite starting material, positioned between the lower and upper imprint plates 406a, 406b in a press, and pressed therewith to form the surface disrupted bipolar plate 454. Accordingly, and as shown in the top perspective view 400, the pristine bipolar plate 404 may include a substantially continuous surface with significantly fewer disruptions, etchings, incisions, indentations, and other deformations than the surface disrupted bipolar plate 454.

Following the pressing, and as further shown in the top perspective view 400, upper and lower surfaces (only the upper surface is visible in FIG. 4) of the surface disrupted bipolar plate 454 may include negative indentations of the lower and upper imprint plates 406a, 406b, respectively. The lower and upper imprint plates 406a, 406b are shown as patterned titanium meshes formed from a grid of rows and columns of welded or otherwise adhered titanium wires delimiting a plurality of openings. Accordingly, and as shown in greater detail below at FIG. 5B, the negative indentations may be repeating patterns of asymmetric protrusions, each of the asymmetric protrusions corresponding to a respective one of the plurality of openings in one of the patterned titanium meshes.

Referring now to FIGS. 5A-5B, first and second top perspective views 500, 550 respectively depicting a pristine bipolar plate 504 and a surface disrupted bipolar plate 554 following pressing thereof between a pair of imprint plates are shown. In an exemplary embodiment, one or both of the pristine bipolar plate 504 and the surface disrupted bipolar plate 554 may be prepared for use with a redox flow battery system, such as the redox flow battery system 10 as described in detail above with reference to FIG. 1. For example, the pristine bipolar plate 504 may be formed by injection molding or compression molding a graphite composite starting material, positioned between the pair of imprint plates in a press, and pressed therewith to form the surface disrupted bipolar plate 554. Accordingly, and as shown in the first top perspective view 500, the pristine bipolar plate 504 may include a substantially continuous surface 506 with significantly fewer disruptions, etchings, incisions, indentations, and other deformations than an abraded surface 556 of the surface disrupted bipolar plate 554. Specifically, the substantially continuous surface 506 may have a roughness with Ra<2 μm and the abraded surface 556 may have a roughness with Ra>10 μm.

Following the pressing, and as further shown in the second top perspective view 550, the abraded surface 556 of the surface disrupted bipolar plate 554 may include a negative indentation from one of the pair of imprint plates. The imprint plate leaving the negative indentation on the abraded surface 556 during the pressing may be a patterned mesh formed from a grid of rows and columns of wires delimiting a plurality of openings. Accordingly, the negative indentation may be a repeating pattern of asymmetric protrusions 558, each of the asymmetric protrusions 558 corresponding to a respective one of the plurality of openings in one of the patterned meshes.

Figure 6:
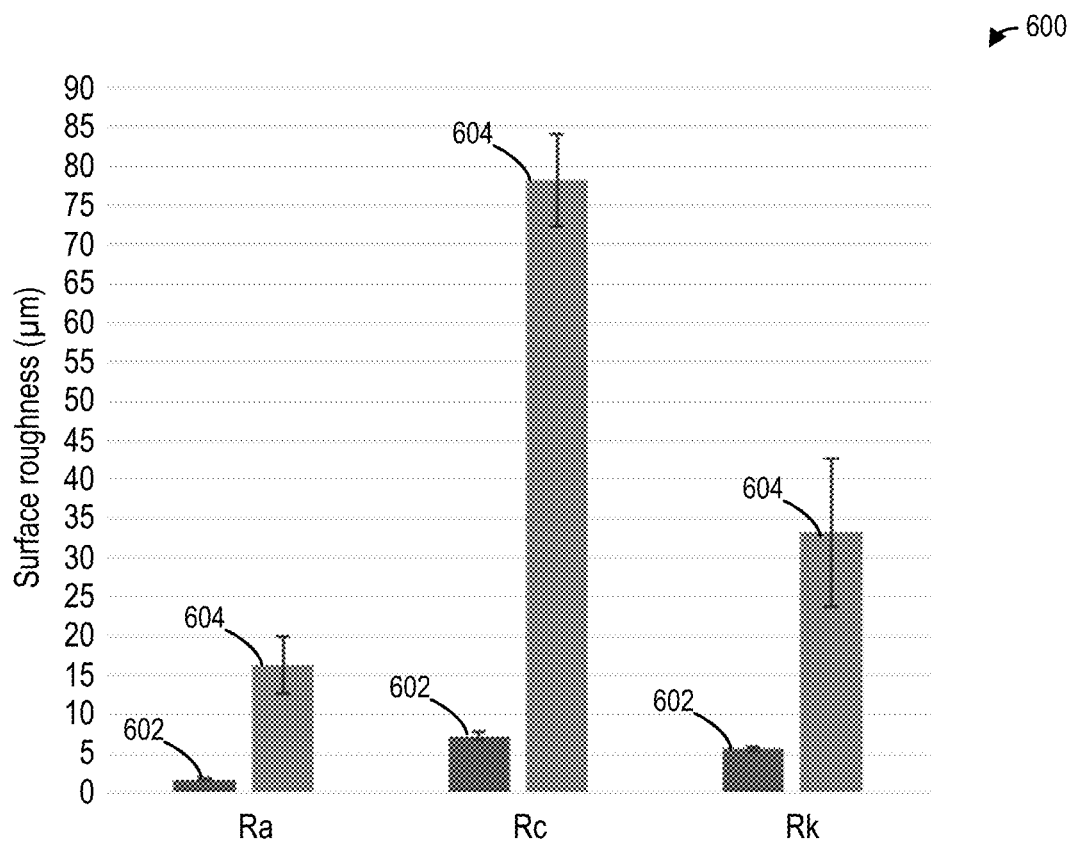
FIG. 6 shows an example plot illustrating Ra, Rc, and Rk values for a surface of an exemplary bipolar plate prior to and following pressing of the surface of the exemplary bipolar plate with an imprint plate.

Referring now to FIG. 6, an example plot 600 depicting each of Ra, Rc, and Rk values for a surface of an exemplary bipolar plate prior to and following pressing of the surface of the exemplary bipolar plate with an imprint plate is shown. As shown in example plot 600, an abscissa labels surface roughness metrics plotted (the Ra, Rc, and Rk values) and an ordinate represents a magnitude of the surface roughness metrics (in μm). Specifically, bars 602 respectively indicate the Ra, Rc, and Rk values of the surface prior to the pressing of the surface and bars 604 respectively indicate the Ra, Rc, and Rk values of the surface following the pressing of the surface.

As indicated by the bars 602, each of the Ra, Rc, and Rk values of the surface prior to the pressing are relatively low, indicating that the surface is substantially smooth. Specifically, prior to the pressing, the Ra value is less than 5 μm and each of the Rc and Rk values are less than 10 μm. Following the pressing, and as indicated by the bars 604, each of the Ra, Rc, and Rk values increase significantly due to extensive roughening of the surface with the imprint plate. Specifically, following the pressing, the Ra value is greater than 15 μm, the Rc value is greater than 75 μm, and the Rk value is greater than 30 μm. Further, even though the margins of error of the Ra, Rc, and Rk values following the pressing extend below 15 μm, 75 μm, and 30 μm, respectively, the margins of error are still well above the Ra, Rc, and Rk values prior to the pressing, respectively. In this way, pressing of the surface of the exemplary bipolar plate with the imprint plate may realize magnitudes of Ra, Rc, and Rk values that are not obtainable with mechanical pretreatments which rely on scratching or scraping of surfaces of bipolar plates. Further, no excess debris may be retained on the surface of the exemplary bipolar plate following the pressing, thereby maintaining a relatively lengthy usable life of a press conducting the pressing (e.g., extensive wear to machining parts of the press may be reduced relative to machining parts employed in the aforementioned mechanical pretreatments).

Referring now to FIGS. 7 and 8, a top view 700 depicting a plating 760 of a first exemplary bipolar plate 702 following initial charge cycling of a first exemplary redox flow battery system including the first exemplary bipolar plate 702 and a top view 800 depicting a plating 860 of a second exemplary bipolar plate 802 following initial charge cycling of a second exemplary redox flow battery system including the second exemplary bipolar plate 802 are respectively shown. Each of the first and second exemplary redox flow battery systems is an all-iron hybrid redox flow battery system (as described in greater detail above with reference to FIG. 1). For instance, the first and second exemplary bipolar plates 702, 802 may be in fluidic communication with negative electrode compartments of the first and second exemplary redox flow battery systems, respectively, the negative electrode compartments respectively including negative electrode spacers configured to distribute $Fe^{2+}$ ions for plating as $Fe^0$ on the first and second exemplary bipolar plates 702, 802, respectively. Each of the first and second exemplary bipolar plates 702, 802 may accordingly be prepared for use in an all-iron hybrid redox flow battery system. For example, a pristine bipolar plate may be formed by injection molding or compression molding a graphite composite starting material, positioned between a pair of imprint plates in a press, and pressed therewith to form the first exemplary bipolar plate 702, the first exemplary bipolar plates 702 having at least one disrupted surface from the pressing between the pair of imprint plates. Following the pressing, the first exemplary bipolar plate 702 may be positioned in the negative electrode compartment of the first exemplary redox flow battery system, where the initial charge cycling may be conducted. In contrast, the second exemplary bipolar plate 802 may not be pressed prior to positioning of the second exemplary bipolar plate 802 in the negative electrode compartment of the second exemplary redox flow battery system to conduct the initial charge cycling.

As shown in the top view 700, the plating 760 may be uniform, substantially smooth, cohesive, and securely adhered across nearly an entirety of one disrupted surface of the first exemplary bipolar plate 702 (e.g., excepting relatively small portions of the disrupted surface whereat a frame is positioned during the initial charge cycling of the first exemplary redox flow battery system). Specifically, the disrupted surface of the first exemplary bipolar plate 702 on which the plating 760 is formed may be uniformly and extensively roughened with an Ra value of greater than 10 µm.

As similarly shown in the top view 800, the plating 860 may cover nearly an entirety of one disrupted surface of the second exemplary bipolar plate 802. However, and in contrast to the plating 760, the plating 860 may be discontinuous, rough, and non-uniform, such that the plating 860 is substantially detached (e.g., not securely adhered) to the disrupted surface of the second exemplary bipolar plate 802. For example, the plating 860 may stress and fracture into particulates and flakes 862 on at least a portion of the disrupted surface of the second exemplary bipolar plate 802. Such inadequate plating may be ascribed to a correspondingly inadequate roughening of the disrupted surface of the second exemplary bipolar plate 802. Specifically, the disrupted surface of the second exemplary bipolar plate 802 on which the plating 860 is formed may be roughened with an Ra value of less than 3.5 µm. Accordingly, formation of disrupted surfaces roughened with the Ra value of greater than 3.5 µm (e.g., greater than 10 µm, as in the disrupted surface of the first exemplary bipolar plate 702) may be desirable for uniform, substantially smooth, and cohesive metal plating on bipolar plates.

Figure 9A:
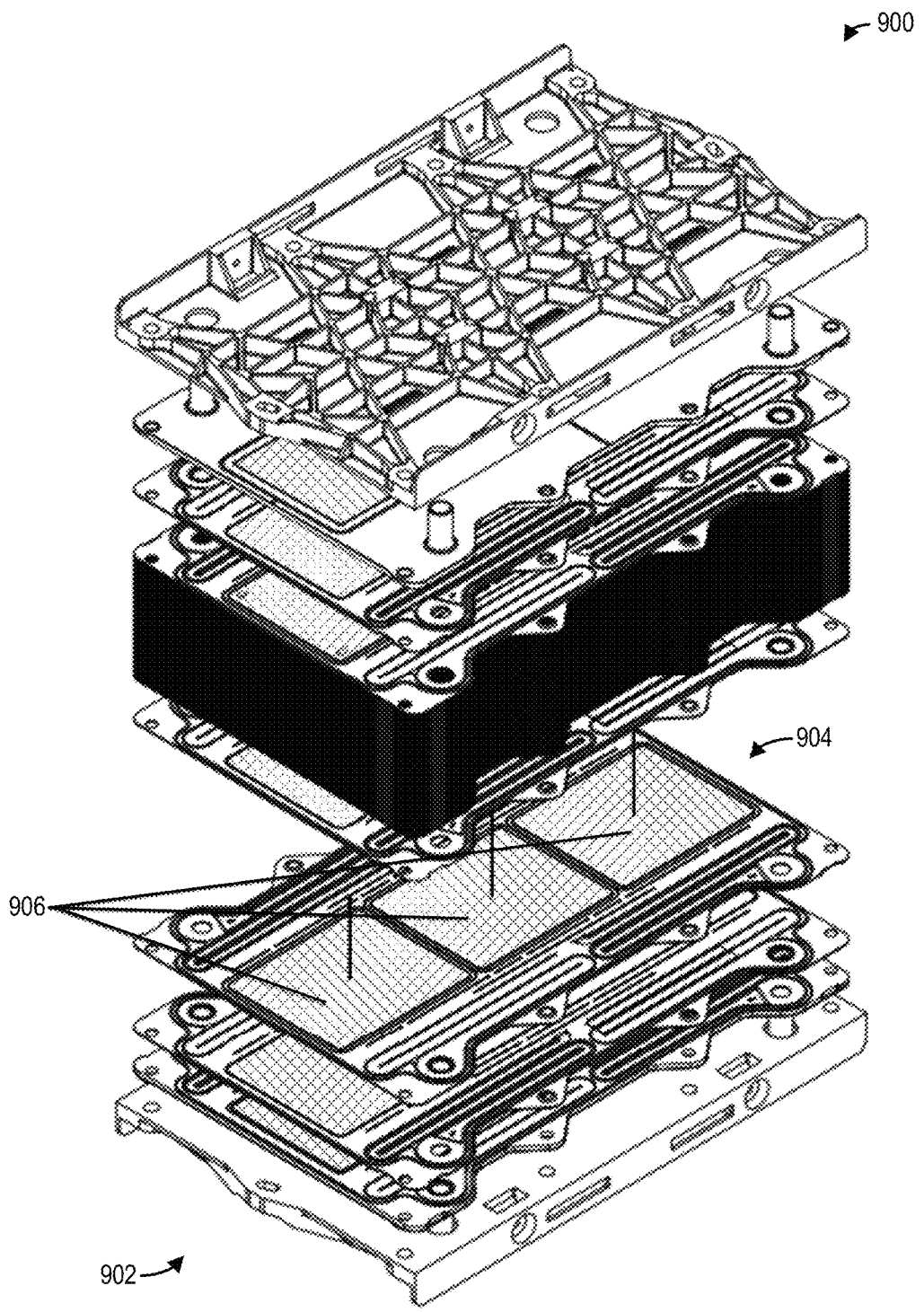
FIG. 9A shows an exploded perspective view of an exemplary electrode assembly stack for a redox flow battery system.
Figure 9B:
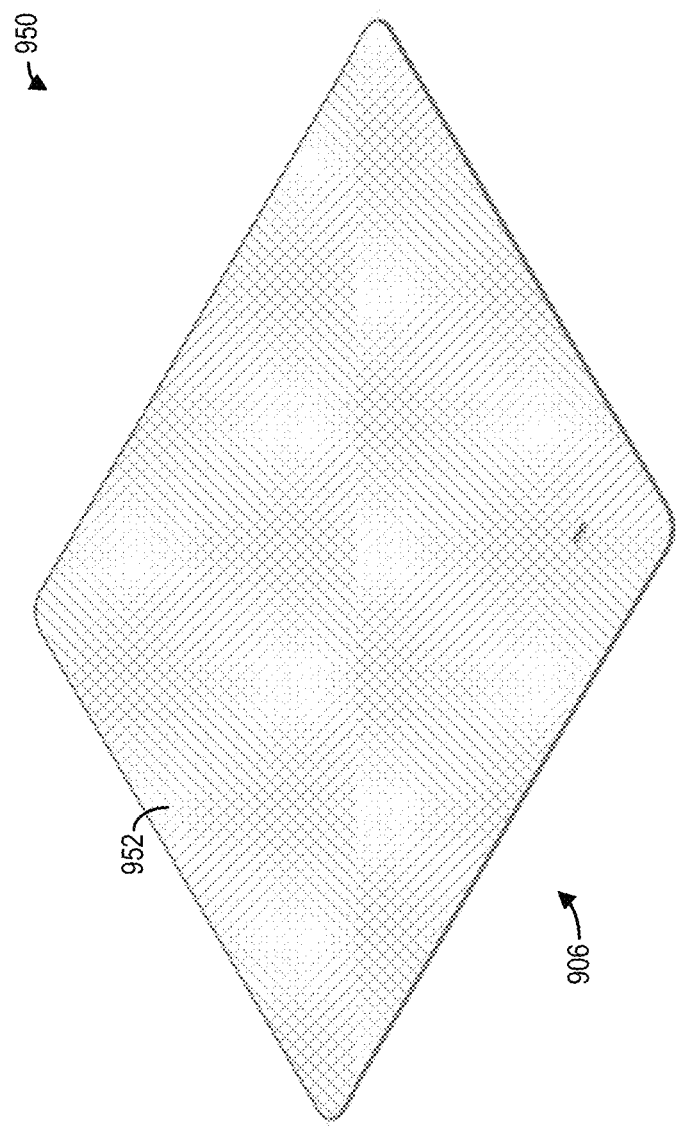
FIG. 9B shows a perspective view of an exemplary surface disrupted bipolar plate for use with the exemplary electrode assembly stack of FIG. 9A.

Referring now to FIGS. 9A and 9B, an exploded perspective view 900 depicting an exemplary electrode assembly stack 902 formed from a plurality of electrode assemblies 904, each of the plurality of electrode assemblies 904 including at least one exemplary surface disrupted bipolar plate 906, and a perspective view 950 depicting the exemplary surface disrupted bipolar plate 906 are respectively shown. In an exemplary embodiment, the exemplary electrode assembly stack 902 may be included in an exemplary redox flow battery system, such as the redox flow battery system 10 as described in detail above with reference to FIG. 1. Accordingly, each of the plurality of electrode assemblies 904 may be configured as a respective redox flow battery cell (e.g., the redox flow battery cell 18 of FIG. 1). It will be appreciated, however, that the embodiment of FIGS. 9A and 9B is non-limiting and exemplary, and that the redox flow battery system 10 of FIG. 1 may be assembled according to other configurations.

For example, and as shown in the exploded perspective view 900, each given electrode assembly 904 of the plurality of electrode assemblies 904 may include three exemplary surface disrupted bipolar plates 906 positioned between and fluidly coupled to positive and negative electrode compartments corresponding to the given electrode assembly 904. Thus, each of the three exemplary surface disrupted bipolar plates 906 may include a positive side (interfacing and in fluidic communication with the positive electrode compartment of the given electrode assembly 904) and a negative side (interfacing and in fluidic communication with the negative electrode compartment of the given electrode assembly 904). A membrane separator (not shown at FIGS. 9A and 9B) may further be included, e.g., beneath one or more of the three exemplary surface disrupted bipolar plates 906. It will be appreciated that greater or fewer exemplary surface disrupted bipolar plates 906 may be included in each of the plurality of electrode assemblies 904 than shown in the exploded perspective view 900 as desired for a given application.

As shown in the perspective view 950, one or both of the positive and negative sides of each exemplary surface disrupted bipolar plate 906 may include an abraded surface 952 (e.g., having an Ra value>10 µm). For example, the negative side of each exemplary surface disrupted bipolar plate 906 may include the abraded surface 952. In an exemplary embodiment, the abraded surface 952 formed via pressing induced disruption of an initially smooth, pristine surface of each exemplary surface disrupted bipolar plate 906.

Figure 10:
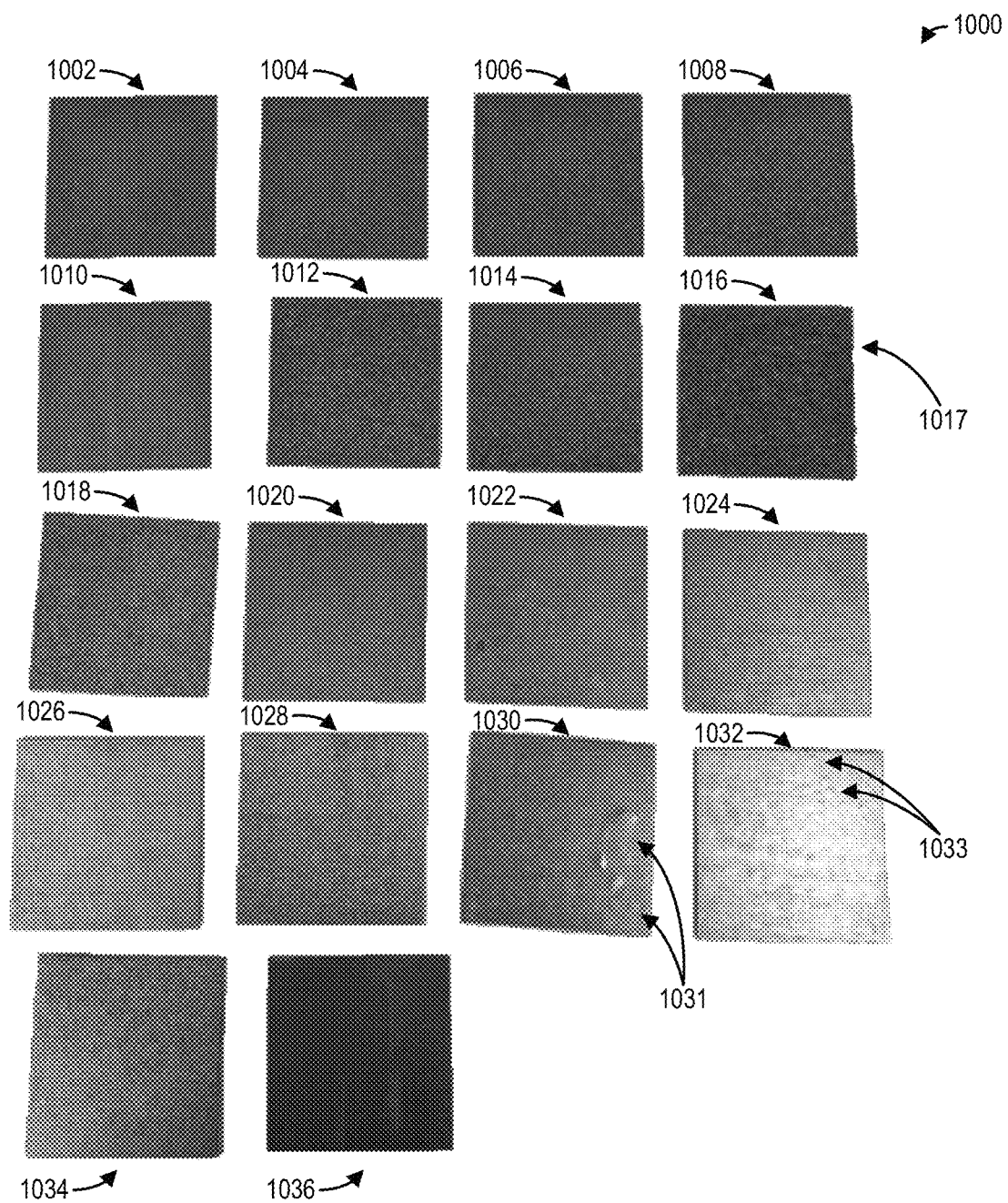
FIG. 10 shows top views of exemplary bipolar plates following pressing with imprint plates and a pristine bipolar plate having no surface disruption thereon.

Referring now to FIG. 10, a top view 1000 depicting a pristine bipolar plate 1036 and surface disrupted bipolar plates 1002, 1004, 1006, 1008, 1010, 1012, 1014, 1016, 1018, 1020, 1022, 1024, 1026, 1028, 1030, 1032, and 1034 (also referred to herein as "surface disrupted bipolar plates 1002 . . . 1034") following pressing thereof between respective pairs of imprint plates are shown. In an exemplary embodiment, one or more of the pristine bipolar plate 1036 and the surface disrupted bipolar plates 1002 . . . 1034 may be prepared for use with a redox flow battery system, such as the redox flow battery system 10 as described in detail above with reference to FIG. 1. For example, the pristine bipolar plate 1036 may be formed by injection molding or compression molding a graphite composite starting material. Accordingly, the pristine bipolar plate 1036 may include a substantially continuous surface with significantly fewer disruptions, etchings, incisions, indentations, and other deformations than abraded surfaces of the surface disrupted bipolar plates 1002 . . . 1034.

Specifically, for the surface disrupted bipolar plates 1002 . . . 1034, pristine bipolar plates formed in the same manner as the pristine bipolar plate 1036 may be positioned between the pair of imprint plates in a press and pressed therewith, thereby forming the abraded surfaces of the surface disrupted bipolar plates 1002 . . . 1034. For example, the abraded surface of a given one of the surface disrupted bipolar plates 1002 . . . 1034 may include a negative indentation from one of the pair of imprint plates used to press the given one of the surface disrupted bipolar plates 1002 . . . 1034.

Each of the pristine bipolar plate 1036 and the surface disrupted bipolar plates 1002 . . . 1034 may be formed so as to have a compressive yield strength of 65 MPa and a ram force of 13210 N (~2970 lbf or ~1.485 tons) to achieve appreciable surface disruption with at least one of the pair of imprint plates. Exemplary subscale parameters, including pressing conditions, for the surface disrupted bipolar plates 1002 . . . 1034 are provided in Table 2 below and compared to conditions of the pristine bipolar plate 1036, where the pressing conditions which achieve more extensive surface disruption may overcome the compressive yield strength of 65 MPa. It will be appreciated that other pressing conditions (e.g., besides those provided in Table 2 below) may be employed as long as the press may be sufficiently sized and configured to apply such pressing conditions for a given bipolar plate size. However, a range may be established for each given pressing condition of a given press, outside of which inadequate or excessive surface disruption may result for a given bipolar plate. For example, inadequate surface disruption of the given bipolar plate may include insufficient abrading of the given bipolar plate, whereas excessive surface disruption of the given bipolar plate may include fragility and instability, e.g., flaking 1017, of a surface of the given bipolar plate. Further, excessively high pressing temperatures may result in undesirable deformation, e.g., blistering 1031 and 1033, of the surface of the given bipolar plate.

TABLE 2

Exemplary subscale parameters for the surface disrupted bipolar plates 1002 . . . 1034 and the pristine bipolar plate 1036. Surface disruption is characterized by qualitative descriptions which correspond to an increase in surface roughness from "minimal (very light) effect" to "light effect" to "medium effect" to "medium-high effect" to "high effect," with "medium-high effect" being most desirable for redox flow battery systems (with "high effect" resulting in extensive flaking, e.g., the flaking 1017).

| Bipolar plate | Pressing temperature of press (° F.) | Ram force of press (lbf) | Pressing pressure of press (MPa) | Pressing duration (s) | Surface characterization (following pressing) |
|---|---|---|---|---|---|
| 1002 (following first pressing) | 400 | 3500 | 76.60 | 30 | Minimal (very light) effect |
| 1002 (following second pressing) | 400 | 4800 | 105.1 | 30 | Light effect |
| 1004 | 400 | 5400 | 118.2 | 30 | Light effect |
| 1006 | 400 | 5400 | 118.2 | 60 | Medium effect |
| 1008 | 400 | 7600 | 166.3 | 30 | Good quality (medium-high effect) |
| 1010 | 450 | 3000 | 65.66 | 30 | Minimal (very light) effect |
| 1012 | 450 | 7500 | 164.1 | 35 | Good quality (medium-high effect) |
| 1014 | 450 | 5500 | 120.4 | 30 | Non-uniform |
| 1016 | 450 | 10000 | 218.9 | 15 | High effect; extensive flaking 1017 |
| 1018 | 400 | 10000 | 218.9 | 30 | Good quality (medium-high effect) |
| 1020 | 500 | 2000 | 43.77 | 30 | Minimal (very light) effect |
| 1022 | 500 | 2000 | 43.77 | 60 | Minimal (very light) effect |
| 1024 | 500 | 2000 | 43.77 | 60 | Minimal (very light) effect |
| 1026 | 500 | 2500 | 54.72 | 30 | Non-uniform; light effect |
| 1028 | 500 | 3500 | 76.60 | 30 | Light effect |
| 1030 | 530 | 2000 | 43.77 | 30 | Blistering 1031 |
| 1032 | 530 | 2000 | 43.77 | 60 | Blistering 1033 |
| 1034 | 530 | 3000 | 65.66 | 30 | Non-uniform; medium effect |
| 1036 | N/A (nominally room temperature) | N/A (nominally zero) | N/A (nominally zero) | N/A (nominally zero) | Control; no surface disruption |

Figure 11:
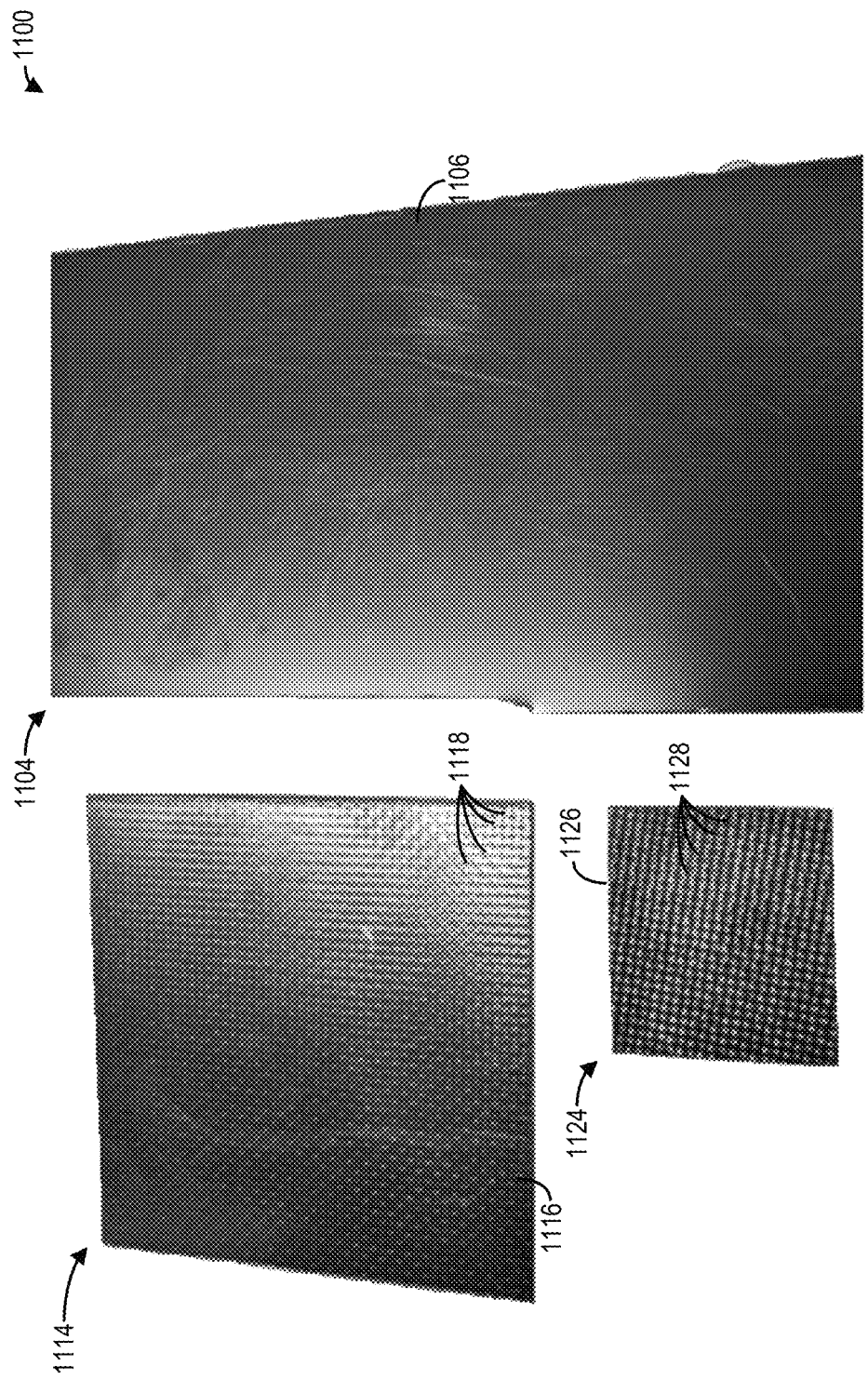
FIG. 11 shows top views of exemplary bipolar plates prior to and following pressing with imprint plates at two exemplary sets of pressing conditions.
Figure 12A:
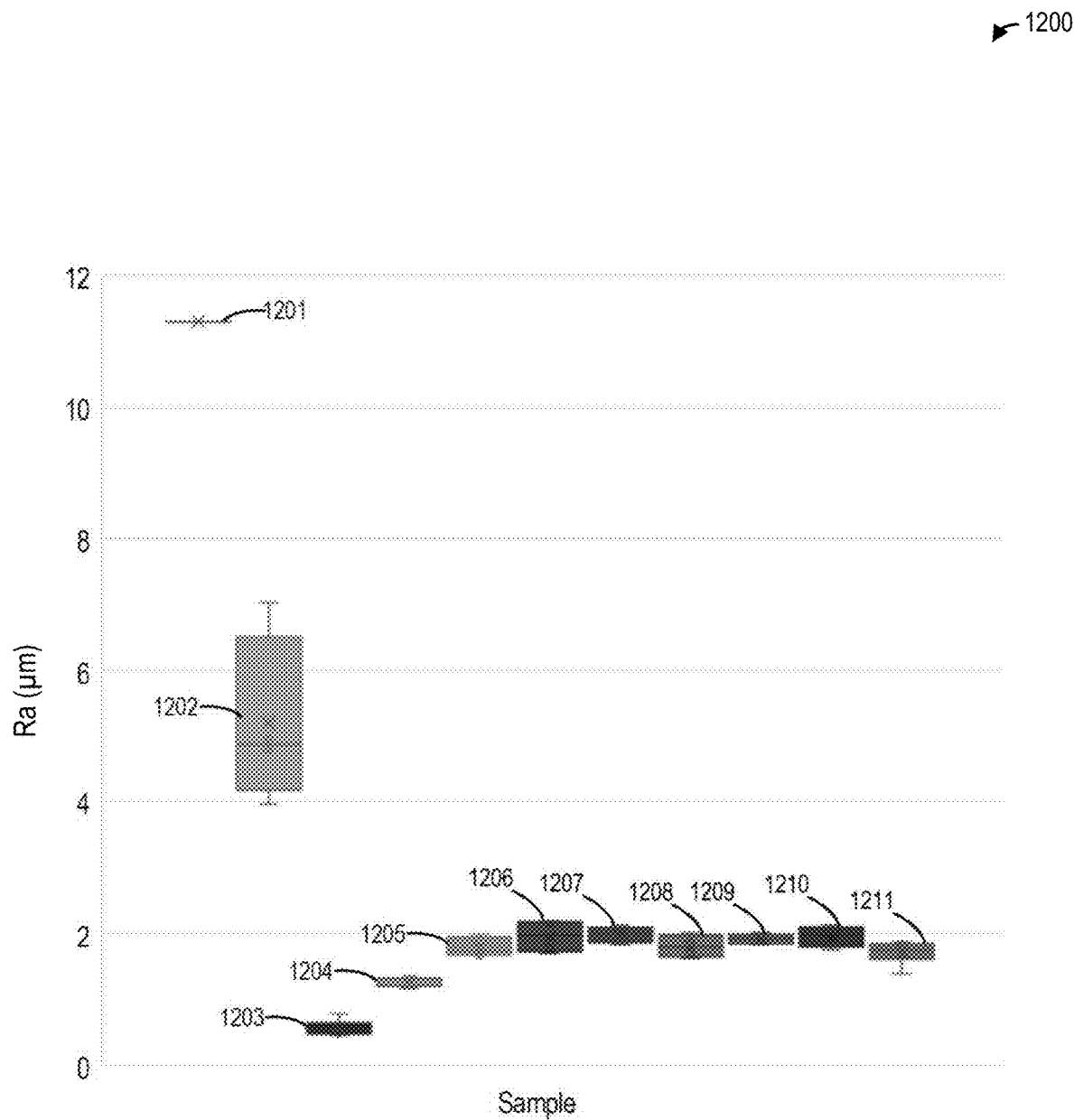
FIGS. 12A-12D show example plots illustrating Ra, Rc, Rk, and Rsm values for surfaces of exemplary bipolar plates prior to and following disruption of the surfaces of the exemplary bipolar plates.
Figure 12B:
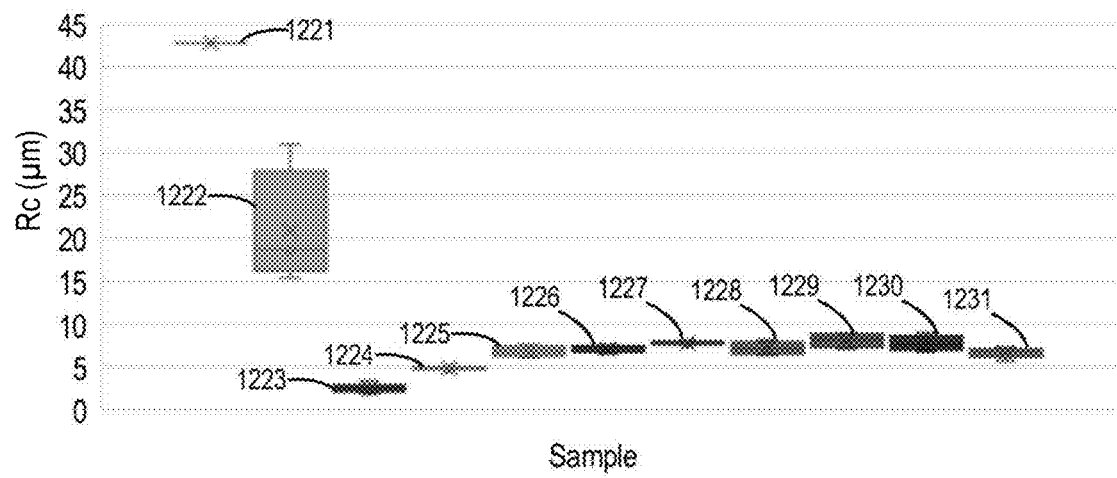
Figure 12C:
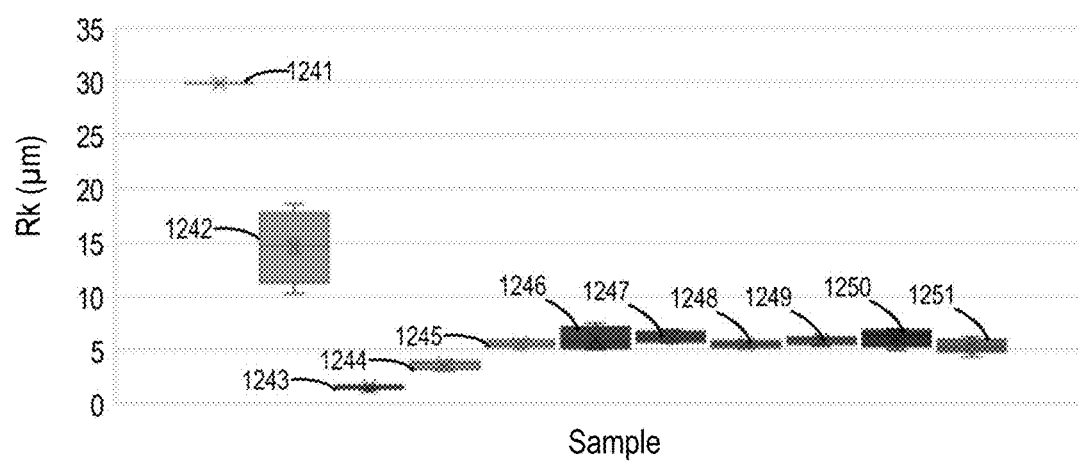
Figure 12D:
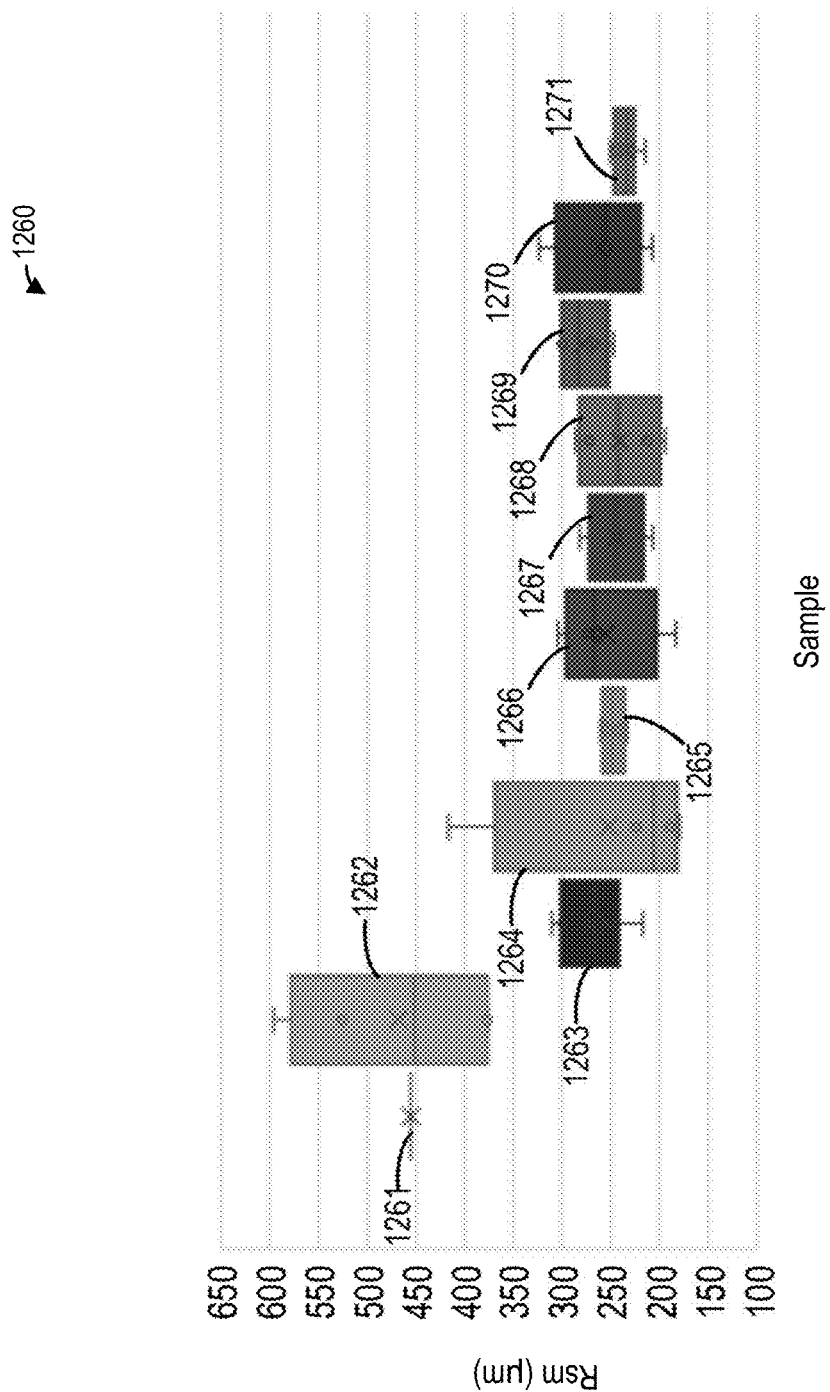

Referring now to FIG. 11, a top view 1100 depicting a pristine bipolar plate 1104, a first surface disrupted bipolar plate 1114 following pressing thereof between a pair of imprint plates, and a second surface disrupted bipolar plate 1124 following pressing thereof between the pair of imprint plates, is shown. In an exemplary embodiment, one or more of the pristine bipolar plate 1104, the first surface disrupted bipolar plate 1114, and the second surface disrupted bipolar plate 1124 may be prepared for use with a redox flow battery system, such as the redox flow battery system 10 as described in detail above with reference to FIG. 1. For example, the pristine bipolar plate 1104 may be formed by injection molding or compression molding a graphite composite starting material composed of 60% graphite and 40% PE resin. For the first and second surface disrupted bipolar plates 1114 and 1124, pristine bipolar plates formed in the same manner as the pristine bipolar plate 1104 may be positioned between the pair of imprint plates in a press and pressed therewith, thereby forming the abraded surfaces of the first and second surface disrupted bipolar plates 1114 and 1124. The first and second surface disrupted bipolar plates 1114 and 1124 may be formed with different pressing conditions. Due to the relatively high percentage of the PE (a thermoplastic) resin, a relatively lower pressing temperature may be employed in the pressing to avoid excessive deformation of the pristine bipolar plates. Accordingly, the first surface disrupted bipolar plate 1114 may be formed by pressing at room temperature (e.g., no heat applied during pressing) and the second surface disrupted bipolar plate 1124 may be formed by pressing at a pressing temperature of 122° C. Since the first surface disrupted bipolar plate 1114 is pressed at a lower pressing temperature than the second surface disrupted bipolar plate 1124, a higher ram force and pressing duration may be used in pressing the first surface disrupted bipolar plate 1114 than the second surface disrupted bipolar plate 1124. For example, the first surface disrupted bipolar plate 1114 may be formed by pressing at a (ramping) ram force of 3700 to 7200 lbf for a pressing duration of 30 s and the second surface disrupted bipolar plate 1124 may be formed by pressing at a ram force of 700 lbf for a pressing duration of 15 s.

As shown in the top view 1100, the pristine bipolar plate 1104 may include a substantially continuous surface 1106 with significantly fewer disruptions, etchings incisions, indentations, and other deformations than abraded surfaces 1116 and 1126 of the first and second surface disrupted bipolar plates 1114 and 1124, respectively. Following the pressing, and as further shown in the top view 1100, each of the abraded surfaces 1116 and 1126 of the first and second surface disrupted bipolar plates 1114 and 1124, respectively, may include a negative indentation from one of the pair of imprint plates. The imprint plate leaving the negative indentation on each of the abraded surfaces 1116 and 1126 during the pressing may be a patterned mesh formed from a grid of rows and columns of wires delimiting a plurality of openings. Accordingly, the negative indentation on the first surface disrupted bipolar plate 1114 may be a repeating pattern of asymmetric protrusions 1118, each of the asymmetric protrusions 1118 corresponding to a respective one of the plurality of openings in one of the patterned meshes. Similarly, the negative indentation on the second surface disrupted bipolar plate 1124 may be a repeating pattern of asymmetric protrusions 1128, each of the asymmetric protrusions 1128 corresponding to a respective one of the plurality of openings in one of the patterned meshes. However, a surface roughness of the abraded surface 1126 may be greater than a surface roughness of the abraded surface 1116, such that the asymmetric protrusions 1128 may be higher on average than the asymmetric protrusions 1118.

Referring now to FIGS. 12A-12D, example plots 1200, 1220, 1240, and 1260 depicting the Ra, Rc, Rk, and Rsm values, respectively, for surfaces of a pristine bipolar plate sample and surface disrupted bipolar plate samples are shown. As shown in each of the example plots 1200, 1220, 1240, and 1260, box plots are spatially aligned in sequence along an abscissa, each of the box plots corresponding to a given surface roughness metric (the Ra, Rc, Rk, and Rsm values) for a given bipolar plate sample. As further shown in each of the example plots 1200, 1220, 1240, and 1260, an ordinate represents a magnitude of the Ra, Rc, Rk, and Rsm values, respectively (in μm). As shown in Table 3 below, a box plot of a given bipolar plate sample may be labeled with a similar number across each of the example plots 1200, 1220, 1240, and 1260. Further, a box plot of a given bipolar plate sample may be shown with the same color across each of the example plots 1200, 1220, 1240, and 1260.

TABLE 3

Reference indicators labeling box plots in example plots 1200, 1220, 1240, and 1260 of FIGS. 12A-12D, respectively.

| Sample description | Reference indicator used in example plot 1200 | Reference indicator used in example plot 1220 | Reference indicator used in example plot 1240 | Reference indicator used in example plot 1260 |
|---|---|---|---|---|
| Surface disrupted via pressing | 1201 | 1221 | 1241 | 1261 |
| Surface disrupted via a timing belt | 1202 | 1222 | 1242 | 1262 |
| Pristine | 1203 | 1223 | 1243 | 1263 |
| Surface disrupted via one scuffing | 1204 | 1224 | 1244 | 1264 |
| Surface disrupted via two scuffings | 1205 | 1225 | 1245 | 1265 |
| Surface disrupted via three scuffings | 1206 | 1226 | 1246 | 1266 |
| Surface disrupted via four scuffings | 1207 | 1227 | 1247 | 1267 |
| Surface disrupted via five scuffings | 1208 | 1228 | 1248 | 1268 |
| Surface disrupted via six scuffings | 1209 | 1229 | 1249 | 1269 |
| Surface disrupted via seven scuffings | 1210 | 1230 | 1250 | 1270 |
| Surface disrupted via eight scuffings | 1211 | 1231 | 1251 | 1271 |

As shown in the example plots 1200, 1220, and 1240, for each of arithmetic mean deviation (Ra), average height (Rc), and core roughness (Rk), the bipolar plate sample including the surface disrupted by pressing (box plots 1201, 1221, and 1241) is significantly higher than each other bipolar plate sample, with the bipolar plate sample including the surface disrupted by the timing belt having the second highest values in each case (box plots 1202, 1222, and 1242) and the pristine bipolar plate sample having the lowest values in each case (box plots 1203, 1223, and 1243). For example, the Ra value of the bipolar plate sample including the surface disrupted by pressing may be 11.3 lam, the Ra value of the bipolar plate sample including the surface disrupted by the timing belt may be 5.2 lam, and the Ra value of the pristine bipolar plate sample may be 0.55 μm. Further, each of Ra, Rc, and Rk increase with an increasing number of scuffing treatments up to three scuffing treatments, with no significant trend in Ra, Rc, or Rk being observed for higher numbers of scuffing treatments.

As shown in the example plot 1260, for mean width (Rsm), each of the bipolar plate sample including the surface disrupted by pressing (box plot 1261) and the bipolar plate sample including the surface disrupted by the timing belt (box plot 1262) are similar to one another in magnitude and significantly higher than each other bipolar plate sample. For example, the Rsm value of the bipolar plate sample including the surface disrupted by pressing may be 456 m and the Rsm value of the bipolar plate sample including the surface disrupted by the timing belt may be 469 μm. Further, the Rsm values for the pristine and scuffed bipolar plate samples are similar to one another in magnitude. For example, the Rsm value of the pristine bipolar plate sample may be 268 μm and the Rsm value of the bipolar plate sample including the surface disrupted by one scuffing treatment may be 252 μm. However, as indicated by the range bars of at least some of the box plots, Rsm values may vary widely across a given bipolar plate sample. In this way, surface disruption of bipolar plates via pressing may obtain improved overall surface roughness relative to pristine bipolar plates or bipolar plates surface disrupted via other mechanical pretreatments, such as via the timing belt or scuffing.

Minimum or maximum Ra, Rc, Rk, and Rsm values of selected box plots are provided in Table 4 below. For certain redox flow battery system applications, minimum Ra, Rc, and Rk values for the bipolar plate sample including the surface disrupted with pressing or the bipolar plate sample including the surface disrupted with the timer belt may be considered desirable minimum threshold Ra, Rc, and Rk values, respectively.

TABLE 4

Minimum or maximum Ra, Rc, Rk, and Rsm values of selected box plots in example plots 1200, 1220, 1240, and 1260 of FIGS. 12A-12D, respectively.

| Sample description | Qualitative performance description for certain redox flow battery system applications | Bound | Ra (μm) | Rc (μm) | Rk (μm) | Rsm (μm) |
|---|---|---|---|---|---|---|
| Surface disrupted via pressing (box plots 1201, 1221, 1241, and 1261) | Good | Minimum | 11.303 | 42.808 | 29.864 | 455.5 |
| Surface disrupted via the timing belt (box plots 1202, 1222, 1242, and 1262) | Good | Minimum | 3.96 | 15.367 | 10.281 | 376.5 |
| Pristine (box plots 1203, 1223, 1243, and 1263) | Bad | Maximum | 0.773 | 3.351 | 1.704 | 310.1 |
| Surface disrupted with one scuffing (box plots 1204, 1224, 1244, and 1264) | Acceptable | Maximum | 1.311 | 5.006 | 3.918 | 417.3 |

In this way, embodiments are provided herein for mechanically pretreating a bipolar plate for use with a negative electrode of a redox flow battery. In some examples, the bipolar plate may be formed from an injection molded or compression molded graphite composite having a resin rich layer thereon. By mechanically pretreating the bipolar plate, the resin rich layer may be roughened such that electrochemical performance losses ascribed to a presence of the layer may be mitigated. Specifically, the bipolar plate may be pressed (e.g., heat pressed) between imprint plates, such as patterned meshes. Following the pressing, surfaces of the bipolar plate in face-sharing contact with the imprint plates may be disrupted and indented with patterns from the imprint plates (e.g., negative indentations of the imprint plates). Unexpectedly, and in contrast to other mechanical pretreatment methods, pressing the bipolar plate may substantially eliminate excess particulates, flakes, and other debris which may interfere with machining parts of mechanical pretreatment equipment while retaining electrochemical performance benefits ascribed to a reduction and roughening of the resin rich layer.

In one example, a method for disrupting surfaces of a bipolar plate for use in a redox flow battery, the method comprising: pressing the bipolar plate between upper and lower imprint plates; and thereafter removing the bipolar plate from the upper and lower imprint plates prior to use in the redox flow battery. A first example of the method further includes wherein the upper imprint plate is positioned between the bipolar plate and an upper platen during the pressing, the bipolar plate not directly contacting the upper platen, and wherein the lower imprint plate is positioned between the bipolar plate and a lower platen during the pressing, the bipolar plate not directly contacting the lower platen. A second example of the method, optionally including the first example of the method, further includes wherein each of the upper and lower imprint plates is a patterned mesh. A third example of the method, optionally including one or more of the first and second examples of the method, further includes wherein the patterned meshes corresponding to the upper and lower imprint plates are independently formed from titanium, steel, ceramic, aluminum, or a combination thereof. A fourth example of the method, optionally including one or more of the first through third examples of the method, further includes wherein the pressing is performed at a pressing temperature of at least 20° C. A fifth example of the method, optionally including one or more of the first through fourth examples of the method, further includes wherein the pressing is performed at a pressing pressure sufficient to overcome a compressive yield strength of the bipolar plate. A sixth example of the method, optionally including one or more of the first through fifth examples of the method, further includes wherein each of the pressing temperature of the pressing and the pressing pressure of the pressing is maintained for a pressing duration of at least 0.2 s. A seventh example of the method, optionally including one or more of the first through sixth examples of the method, further includes wherein upper and lower surfaces of the bipolar plate are smooth and unabraded prior to the pressing, and wherein the upper and lower surfaces of the bipolar plate are disrupted and respectively indented with patterns from the upper and lower imprint plates following the pressing. An eighth example of the method, optionally including one or more of the first through seventh examples of the method, further includes wherein each of the upper and lower surfaces of the bipolar plate is uniformly roughened and textured at Ra>10 μm following the pressing.

In another example, a method for pretreating a bipolar plate for use in a redox flow battery, the method comprising: heat pressing the bipolar plate sandwiched between two patterned plates; removing the two patterned plates from the heat pressed bipolar plate, surfaces of the heat pressed bipolar plate respectively including negative indentations of the two patterned plates; and initiating charge cycling of the redox flow battery, wherein the redox flow battery includes an electrode compartment, the electrode compartment housing the heat pressed bipolar plate upon initiation of charge cycling. A first example of the method further includes wherein each of the negative indentations is patterned as a repeating negative mesh comprising first channels intersecting with second channels, each of the first channels parallel to one another, each of the second channels parallel to one another, and each of the first channels perpendicular to each of the second channels. A second example of the method, optionally including the first example of the method, further includes wherein the heat pressed bipolar plate is free of debris upon removal of the two patterned plates. A third example of the method, optionally including one or more of the first and second examples of the method, further includes wherein each of the surfaces of the heat pressed bipolar plate respectively including the negative indentations of the two patterned plates has a roughness with Ra>10 μm. A fourth example of the method, optionally including one or more of the first through third examples of the method, further includes wherein metal plating formed on any of the surfaces of the heat pressed bipolar plate respectively including the negative indentations of the two patterned plates during the charge cycling comprises less cracking and fewer free particulates and flakes than a bipolar plate with surfaces each having a roughness with Ra≤10 μm.

In yet another example, a redox flow battery system, comprising: positive and negative electrode compartments respectively housing positive and negative electrodes; and a negative bipolar plate positioned in the negative electrode compartment and in fluidic communication with the negative electrode, wherein a surface of the negative bipolar plate facing toward the negative electrode is roughened and textured with a pattern of asymmetric protrusions. A first example of the redox flow battery system further includes wherein the pattern of the asymmetric protrusions is a repeating pattern comprising a grid of rows and columns of the asymmetric protrusions. A second example of the redox flow battery system, optionally including the first example of the redox flow battery system, further includes wherein the surface of the negative bipolar plate is roughened at an Ra value of greater than 3.5 μm and less than 100 μm, an Rc value of greater than 12 μm and less than 60 μm, and an Rk value of greater than 8 μm and less than 45 μm. A third example of the redox flow battery system, optionally including one or more of the first and second examples of the redox flow battery system, further includes wherein the negative bipolar plate is formed by injection molding or compression molding a graphite composite starting material. A fourth example of the redox flow battery system, optionally including one or more of the first through third examples of the redox flow battery system, further includes wherein the surface of the negative bipolar plate including the pattern of the asymmetric protrusions is formed from a resin-rich outer layer. A fifth example of the redox flow battery system, optionally including one or more of the first through fourth examples of the redox flow battery system, further includes wherein the redox flow battery system is an all-iron hybrid redox flow battery system.

FIGS. 9A and 9B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 9A and 9B are drawn approximately to scale, although other dimensions or relative dimensions may be used.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for disrupting surfaces of a bipolar plate for use in a redox flow battery, the method comprising:
   pressing the bipolar plate between upper and lower imprint plates; and thereafter
   removing the bipolar plate from the upper and lower imprint plates prior to use in the redox flow battery,
   wherein each of the upper and lower imprint plates is a patterned mesh, and wherein the patterned mesh has an open framework comprising a grid of rows and columns of wires delimiting a plurality of openings.

2. The method of claim 1, wherein the upper imprint plate is positioned between the bipolar plate and an upper platen during the pressing, the bipolar plate not directly contacting the upper platen,
   wherein the lower imprint plate is positioned between the bipolar plate and a lower platen during the pressing, the bipolar plate not directly contacting the lower platen, and
   wherein the redox flow battery system is an all-iron hybrid redox flow battery system.

3. The method of claim 1, wherein the grid comprises approximately 0.71 wires/mm on each of a length and a width of the upper and lower imprint plates.

4. The method of claim 3, wherein the patterned meshes corresponding to the upper and lower imprint plates are independently formed from titanium, steel, ceramic, aluminum, or a combination thereof.

5. The method of claim 1, wherein the pressing is performed at room temperature and at a pressing pressure sufficient to overcome a compressive yield strength of the bipolar plate.

6. The method of claim 5, wherein the pressing is performed at a pressing pressure between 43 and 218 MPa.

7. The method of claim 6, wherein each of the pressing temperature of the pressing and the pressing pressure of the pressing is maintained for a pressing duration in a range of 0.1 s to 60 s.

8. The method of claim 1, wherein upper and lower surfaces of the bipolar plate are smooth and unabraded prior to the pressing, and wherein the upper and lower surfaces of the bipolar plate are disrupted and respectively indented with patterns from the upper and lower imprint plates following the pressing.

9. The method of claim 8, wherein each of the upper and lower surfaces of the bipolar plate is uniformly roughened and textured at Ra>10 μm following the pressing.

10. A method for pretreating a bipolar plate for use in a redox flow battery, the method comprising:

heat pressing the bipolar plate sandwiched between two patterned plates after formation of the bipolar plate;

removing the two patterned plates from the heat pressed bipolar plate, surfaces of the heat pressed bipolar plate respectively including negative indentations, the negative indentations formed by the two patterned plates; and initiating charge cycling of the redox flow battery, wherein the redox flow battery includes an electrode compartment, the electrode compartment housing the heat pressed bipolar plate upon initiation of charge cycling.

11. The method of claim 10, wherein each of the negative indentations is patterned as a repeating negative mesh comprising first channels intersecting with second channels, each of the first channels parallel to one another, each of the second channels parallel to one another, and each of the first channels perpendicular to each of the second channels.

12. The method of claim 10, wherein the heat pressed bipolar plate is free of debris upon removal of the two patterned plates.

13. The method of claim 10, wherein each of the surfaces of the heat pressed bipolar plate respectively including the negative indentations has a roughness with Ra>10 μm.

14. The method of claim 13, wherein metal plating formed on any of the surfaces of the heat pressed bipolar plate respectively including the negative indentations during the charge cycling comprises less cracking and fewer free particulates and flakes than a bipolar plate with surfaces each having a roughness with Ra≤10 μm.

* * * * *